(12) United States Patent
Agarwal et al.

(10) Patent No.: US 10,943,101 B2
(45) Date of Patent: Mar. 9, 2021

(54) TARGET RECOGNITION AND VERIFICATION USING IMAGE PROCESSING TECHNIQUES AND/OR ARTIFICAL INTELLIGENCE

(71) Applicant: Accenture Global Solutions Limited, Dublin (IE)

(72) Inventors: Rajul Agarwal, Bangalore (IN); Abhilash Manu, Bangalore (IN); Rohini Minunath Nagare, Mumbai (IN); Shringar Kashyap, Bengaluru (IN); Araghya Biswas, Kolkata (IN); Gaurav Tiwari, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 24 days.

(21) Appl. No.: 16/235,732

(22) Filed: Dec. 28, 2018

(65) Prior Publication Data
US 2020/0104851 A1    Apr. 2, 2020

(30) Foreign Application Priority Data
Sep. 28, 2018    (IN) .............................. 201841036737

(51) Int. Cl.
| | | |
|---|---|---|
| *G06K 9/00* | (2006.01) | |
| *G06Q 20/20* | (2012.01) | |
| *G06Q 20/40* | (2012.01) | |
| *G06Q 10/06* | (2012.01) | |
| *G06N 3/08* | (2006.01) | |
| *G06N 20/00* | (2019.01) | |
| *G06K 7/14* | (2006.01) | |

(52) U.S. Cl.
CPC ....... *G06K 9/00302* (2013.01); *G06K 7/1447* (2013.01); *G06K 7/1482* (2013.01);
(Continued)

(58) Field of Classification Search
CPC .. G06Q 20/20; G06Q 20/4016; G06Q 30/018; G06Q 30/00; G07G 1/0045; G06K 9/00
(Continued)

(56) References Cited

U.S. PATENT DOCUMENTS

2012/0308971 A1    12/2012  Shin et al.
2015/0193780 A1*    7/2015  Migdal ................ G06Q 30/018
                                                          705/317
(Continued)

OTHER PUBLICATIONS

"Emotion Recognition-Banuba", https://banuba.com/emotion-recognition, Jun. 25, 2018, 3 pages.
(Continued)

*Primary Examiner* — Olabode Akintola
*Assistant Examiner* — Suckhwan Chon
(74) *Attorney, Agent, or Firm* — Harrity & Harrity, LLP

(57) ABSTRACT

A device receives image data that depicts a target that is subject to a security check, and receives transactional data identifying a characteristic of a transaction associated with the target. The device identifies the target within the image data and identifies a first set of target attributes of the target. The device determines a risk level that represents a likelihood of the characteristic of the transaction having a correct value by analyzing the set of target attributes using one or more attribute recognition techniques and/or using a data model that has been trained using machine learning. The device determines whether the risk level satisfies one or more threshold risk levels. The device provides an alert to another device cause the other device to perform actions based on whether at least one of the one or more threshold risk levels are satisfied.

20 Claims, 13 Drawing Sheets

(52) U.S. Cl.
CPC ..... *G06K 9/00281* (2013.01); *G06K 9/00671* (2013.01); *G06N 3/08* (2013.01); *G06N 20/00* (2019.01); *G06Q 10/0635* (2013.01); *G06Q 20/201* (2013.01); *G06Q 20/4016* (2013.01)

(58) Field of Classification Search
USPC .......................................................... 705/44
See application file for complete search history.

(56) References Cited

U.S. PATENT DOCUMENTS

| | | | |
|---|---|---|---|
| 2016/0171328 A1* | 6/2016 | Bulan | G06K 9/723 382/321 |
| 2016/0350801 A1 | 12/2016 | Vincent et al. | |
| 2018/0032796 A1 | 2/2018 | Kuharenko et al. | |

OTHER PUBLICATIONS

Noldus, "Facial Expression Recognition Software: FaceReader" https://www.noldus.com/human-behavior-research/products/facereader?gclid=Cj0KCQjwpcLZBRCnARIsAMPBgF0WZWTsXsms-s3HTKT2LxgJGr7Oi%E2%80%A6, Jun. 25, 2018, 4 pages.

"Find Face Enterprise Server SDK 2.0", https://findface.pro/en/face-recognition-enterprise-server-sdk.html?utm_source=none&utm_medium=direct&utm_campaign=&utm_term=, Jun. 25, 2018, 5 pages.

"Products-Affectiva", https://www.affectiva.com/what/products/, Jun. 28, 2018, 3 pages.

"Software That Reads Emotions could Be Used to Catch Criminals Before They Act", https://futurism.com/software-that-reads-emotions-could-be-used-to-catch-criminals-before-they-act/, May 12, 2017, 7 pages.

* cited by examiner

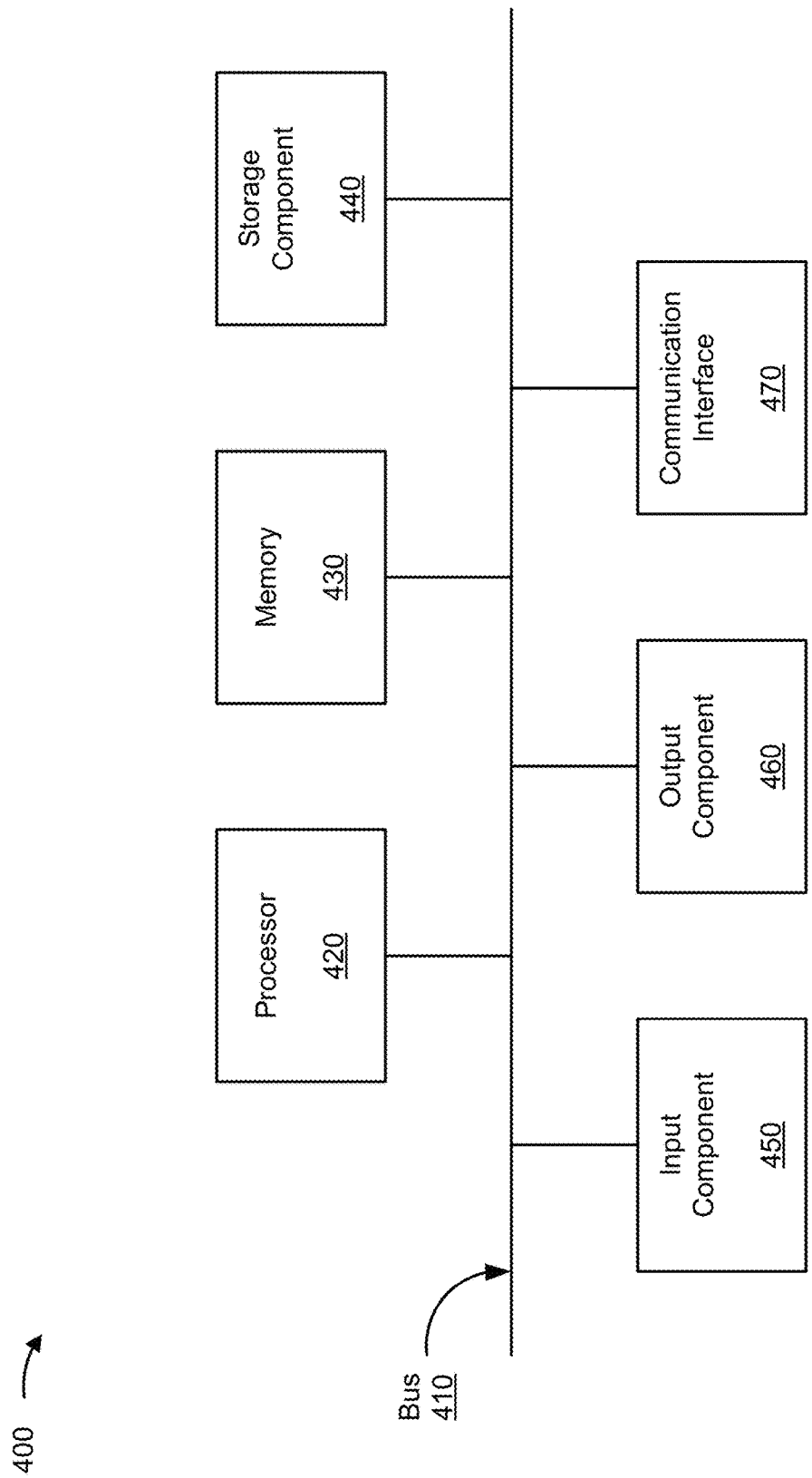

500 ──▶

510 — Receive, from a reporting device, image data that depicts a target that is subject to a security check, wherein the target is: a tag of a product that is to be purchased, or an individual

520 — Identify the target by using a target recognition technique to analyze image data

530 — Identify a set of target attributes of the target

540 — Select a data model to use for the security check based on whether the target is the tag of the product, or the individual, wherein the data model has been trained using one or more machine learning techniques

550 — Determine, as part of the security check, a risk level associated with the target by using the data model to analyze the set of target attributes, wherein determining the risk level includes: determining a likelihood of the product being scanned with a correct price, or determining, based on one or more emotions of the individual, a likelihood of the individual being involved in a harmful act

560 — Determine whether the risk level satisfies one or more threshold risk levels

570 — Provide an alert another device to cause the other device to perform a set of actions, wherein the alert is selected based on whether the risk level satisfies at least one of the one or more threshold risk levels, and wherein the set of actions include: a first subset of actions that are indicative of the risk level being associated with a low amount of risk, or a second subset of actions that are indicative of the risk level being associated with a high amount of risk and that are associated with assisting in prevention of a fraudulent transaction involving the product or that are associated with assisting in prevention of the harmful act

FIG. 5

TARGET RECOGNITION AND VERIFICATION USING IMAGE PROCESSING TECHNIQUES AND/OR ARTIFICAL INTELLIGENCE

RELATED APPLICATION

This application claims priority under 35 U.S.C. § 119 to Indian Provisional Patent Application No. 201841036737, filed on Sep. 28, 2018, the content of which is incorporated by reference herein in its entirety.

BACKGROUND

Theft of consumer products is a growing concern for organizations. For example, an organization in a retail industry may lose a percentage of gross profits due to shrinkage resulting from customer theft, employee theft, and/or the like.

SUMMARY

According to some implementations, a method may include receiving, from a reporting device, image data that depicts a tag of a product that is subject to a security check. The method may include receiving product price data that identifies a price of the product. The method may include identifying the tag within the image data by using one or more object recognition techniques to analyze the image data. The method may include identifying a set of tag attributes of the tag. The method may include determining, as part of the security check, a risk level that represents a likelihood of the product being scanned with a correct price by analyzing the set of tag attributes. Analyzing the set of tag attributes may include at least one of analyzing the set of tag attributes using one or more attribute recognition techniques or analyzing the set of tag attributes with a data model that has been trained using one or more machine learning techniques. The method may include determining whether the risk level satisfies one or more threshold risk levels. The method may include providing an alert to another device to cause the other device to perform a set of actions. The alert may be selected based on whether the risk level satisfies at least one of the one or more threshold risk levels. The set of actions may include a first subset of actions that are indicative of the risk level being associated with a low amount of risk, or a second subset of actions that are indicative of the risk level being associated with a high amount of risk and that are associated with assisting in prevention of a fraudulent transaction involving the product.

According to some implementations, a device may include one or more memories, and one or more processors, operatively coupled to the one or more memories, to receive image data that depicts a tag of a product that is subject to a security check, and to receive product price data that identifies a price of the product. The one or more processors may identify the tag within the image data by using one or more object recognition techniques to analyze the image data and may identify a first set of tag attributes of the tag. The one or more processors may determine a risk level associated with the tag based on an analysis of the first set of tag attributes. The analysis may include a first analysis to determine whether the first set of tag attributes matches or satisfies a threshold level of similarity with a second set of tag attributes that are stored in association with one or more values that are capable of serving as indicators of a harmful act, or a second analysis that uses one or more machine learning techniques to analyze the first set of tag attributes to determine a likelihood that the harmful act is occurring or will occur. The one or more processors may determine whether the risk level satisfies a threshold risk level, and may select, based on whether the risk level satisfies the threshold risk level, at least one of: another device that is to be a recipient of an alert, and content that is to be used as part of the alert. The one or more processors may provide the alert to the other device to cause the other device to perform a first set of actions if the risk level fails to satisfy the threshold risk level or a second set of actions if the risk level satisfies the threshold risk level.

According to some implementations, a non-transitory computer-readable medium may store instructions that include one or more instructions that, when executed by one or more processors of a first device, cause the one or more processors to receive, from a reporting device, image data that depicts a tag of a product that is subject to a security check, and to receive product price data that identifies a price of the product. The one or more instructions may cause the one or more processors to identify the tag by using one or more object recognition techniques to analyze the image data. The one or more instructions may cause the one or more processors to identify a first set of tag attributes of the tag. The one or more instructions may cause the one or more processors to determine a risk level that represents a likelihood of the product being scanned with a correct price by performing an analysis of the first set of tag attributes. The analysis may include at least one of: a first analysis to determine whether the first set of tag attributes matches or satisfies a threshold level of similarity with a second set of tag attributes that are stored in association with one or more values that are capable of serving as indicators of whether the product was scanned with the correct price, or a second analysis that uses one or more machine learning techniques to analyze the first set of tag attributes to determine a likelihood of whether the product was scanned with the correct price. The one or more instructions may cause the one or more processors to determine whether the risk level satisfies a threshold risk level. The one or more instructions may cause the one or more processors to provide an alert to a second device to cause the second device to perform a first set of actions based on the risk level not satisfying the threshold risk level or a second set of actions based on the risk level satisfying the threshold risk level.

BRIEF DESCRIPTION OF THE DRAWINGS

FIG. 4 is a diagram of example components of one or more devices of FIG. 3.

FIGS. 5-8 are flow charts of example processes described herein.

DETAILED DESCRIPTION

Figure 1A:
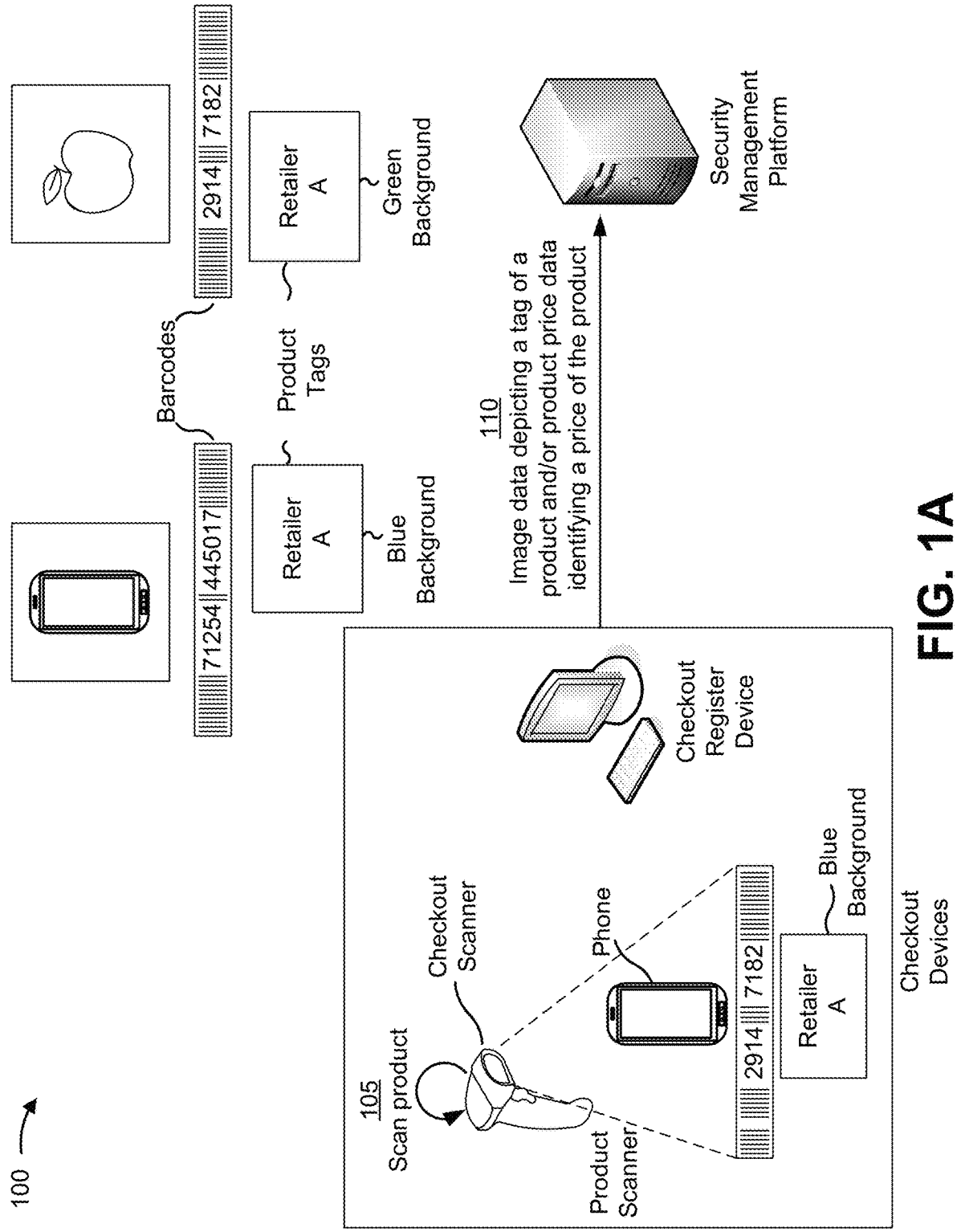
FIGS. 1A-1C are diagrams of one or more example implementations described herein.

The following detailed description of example implementations refers to the accompanying drawings. The same reference numbers in different drawings may identify the same or similar elements.

A barcode is an optical, machine-readable representation of data. Radio-frequency identification (RFID) uses electromagnetic fields to automatically identify and track tags attached to products. In many cases, the optical data of a barcode may be scanned during a checkout procedure, and an RFID tag may be deactivated to allow a consumer leave with a product without triggering an alarm.

However, the optical data of the barcode is configured such that the barcode needs to be visible to be scanned. In this case, consumer theft may occur if the consumer puts a different barcode tag on top of the original barcode tag of the product. For example, an individual may replace the barcode of an expensive product with a barcode of an inexpensive product, which may allow the consumer to leave the store without having to pay full price for the product. In this case, the RFID tag would still deactivate because the RFID tag is not embedded with data that allows product price to be a consideration in determining whether to deactivate the RFID tag. Furthermore, this causes one or more devices of an organization to waste resources (e.g., computing resources, network resources, memory resources, and/or the like) by processing a fraudulent transaction, to waste resources to analyze records to identify that product theft has occurred, to waste resources generating reports describing the fraudulent transaction, to waste resources investigating the fraudulent transaction, and/or the like.

Additionally, employee theft may occur if an employee steals from the organization while loading and/or unloading products at a loading dock, while working at a cash register, while assisting in customer returns of products, and/or the like. One solution involves using closed-circuit television (CCTV) cameras to manually monitor employees. However, this solution is time consuming and ineffective, and a security officer reviewing the feed may be unable to identify when product theft is occurring. Furthermore, this causes one or more devices of the organization to waste resources to identify that product theft has occurred, to waste resources investigating a cause of the product theft, and/or the like.

Some implementations described herein provide a security management platform to identify a target that is subject to a security check, to use machine learning to determine a likelihood of the target being involved with a harmful act, and to cause one or more other devices to perform a set of actions that may reduce product theft. For example, a recording and/or reporting device, such as a camera that is located at or near a store, may capture image data that depicts the target, and may provide the image data to the security management platform. The camera may be located at a checkout register of a store, at an isle within the store, at a loading dock associated with the store, and/or the like. A harmful act, as used herein, may refer to a fraudulent or erroneous transaction, a theft of a product, mislabeling of the product (e.g., intentional, negligent, etc.), another type of action or crime leading or relating to theft of the product (e.g., assisting in theft of the product, such as being an accessory to the product theft), an act that is harmful to an organization or store (e.g., by causing loss of revenue, by causing a poor customer service experience, by causing or contributing to inaccurate inventory management and/or the like), an act that is harmful to an individual within the store (e.g., by causing physical harm, emotional harm, and/or the like), a problematic event that causes a disruption to a work-related task, and/or the like.

In some cases, a special tag of a product (referred to herein as a tag) may be the target of the security check. For example, a customer may purchase the product (e.g., via the checkout register) and the security check may involve analyzing the tag using object recognition to determine whether the product is scanned with a correct price. In other cases, an individual, such as an employee working at or near the store, may be the target of the security check. For example, the security check may involve analyzing images of the individual to identify the individual's facial features, analyzing the individual's facial features to determine one or more human emotions exhibited by the individual, and/or the like. Additionally, the security check may be used to determine a likelihood of the individual being involved in a harmful act (e.g., committing a crime) based on the identified human emotions.

Additionally, the security management platform may determine a risk level associated with the target. For example, the security management platform may identify the target and a set of attributes of the target and may analyze the set of target attributes to determine a risk level that indicates a likelihood of the individual being involved in a harmful act (as defined further herein). In this case, the security management platform may determine whether the risk level satisfies a threshold risk level and may provide another device with an alert based on whether the risk level satisfies the threshold risk level. For example, the security management platform may provide, to a device associated with the store (e.g., a device accessible to a store manager, a security officer, a checkout agent, and/or the like), an alert indicating the likelihood of the harmful act occurring, instructions to investigate a transaction involving purchasing the product, instructions to stop the transaction, instructions to modify a frequency at which the individual is monitored by the reporting device, instructions to request an investigation of the individual, and/or the like.

In this way, the security management platform identifies when an individual is involved in a harmful act and causes other devices to perform corrective or preventative actions associated with the harmful act. For example, the security management platform prevents or reduces product theft by identifying when a product is scanned with an incorrect tag and by causing other devices to perform actions to ensure that a transaction to purchase the product is not processed. This conserves resources (e.g., processing resources, network resources, and/or the like) that would otherwise be used to process a fraudulent transaction, that would be expended to identify fraud after the fraud has occurred, to report the transaction as fraudulent, to investigate a fraudulent transaction, and/or the like.

As another example, the security management prevents or reduces product theft by identifying situations where an individual (e.g., an employee of an organization) exhibits particular facial expressions or gestures, which may correlate to behaviors or emotions that align with an increased likelihood of being involved with theft of a product (e.g., by detecting that at a certain reoccurring time period, the employee is anxious, nervous, uneasy, and/or the like). By identifying these situations, the security management platform conserves resources that would otherwise be expended to identify fraud after the fraud has occurred, to report the transaction as fraudulent, to investigate a fraudulent transaction, and/or the like.

Furthermore, several different stages of the process described herein are automated, which may remove human subjectivity and waste from the process, and which may improve speed and efficiency of the process and conserve computing resources (e.g., processor resources, memory resources, and/or the like). For example, the security management platform may, without human intervention, automatically analyze video files or image files of individuals (e.g., employees) that are being monitored. This eliminates a need for a human user to manually view and/or analyze the video files and image files, thereby reducing or eliminating chances of human error and improving quality and efficiency of the process. Additionally, implementations described herein use a rigorous, computerized process to perform tasks or roles that were not previously performed or were previously performed using subjective human intuition or input.

Figure 1B:
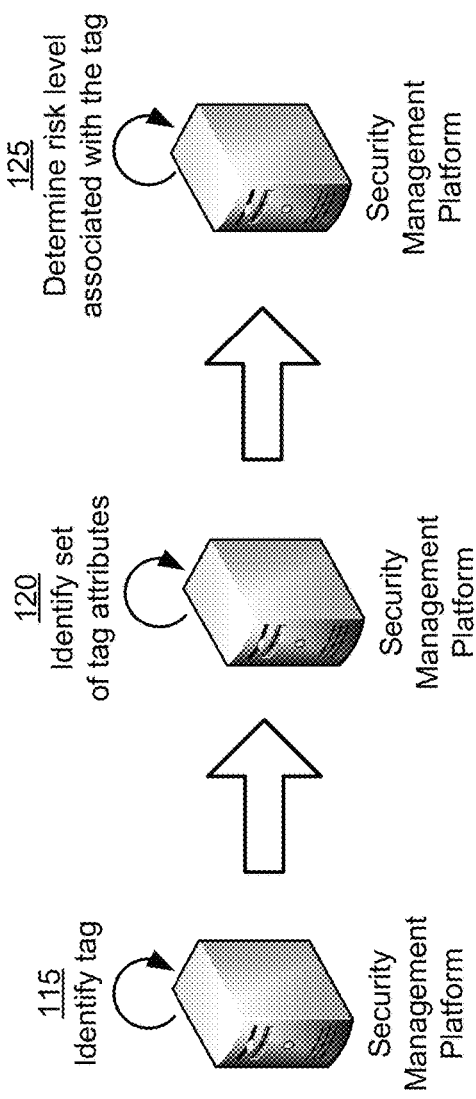
Figure 1C:
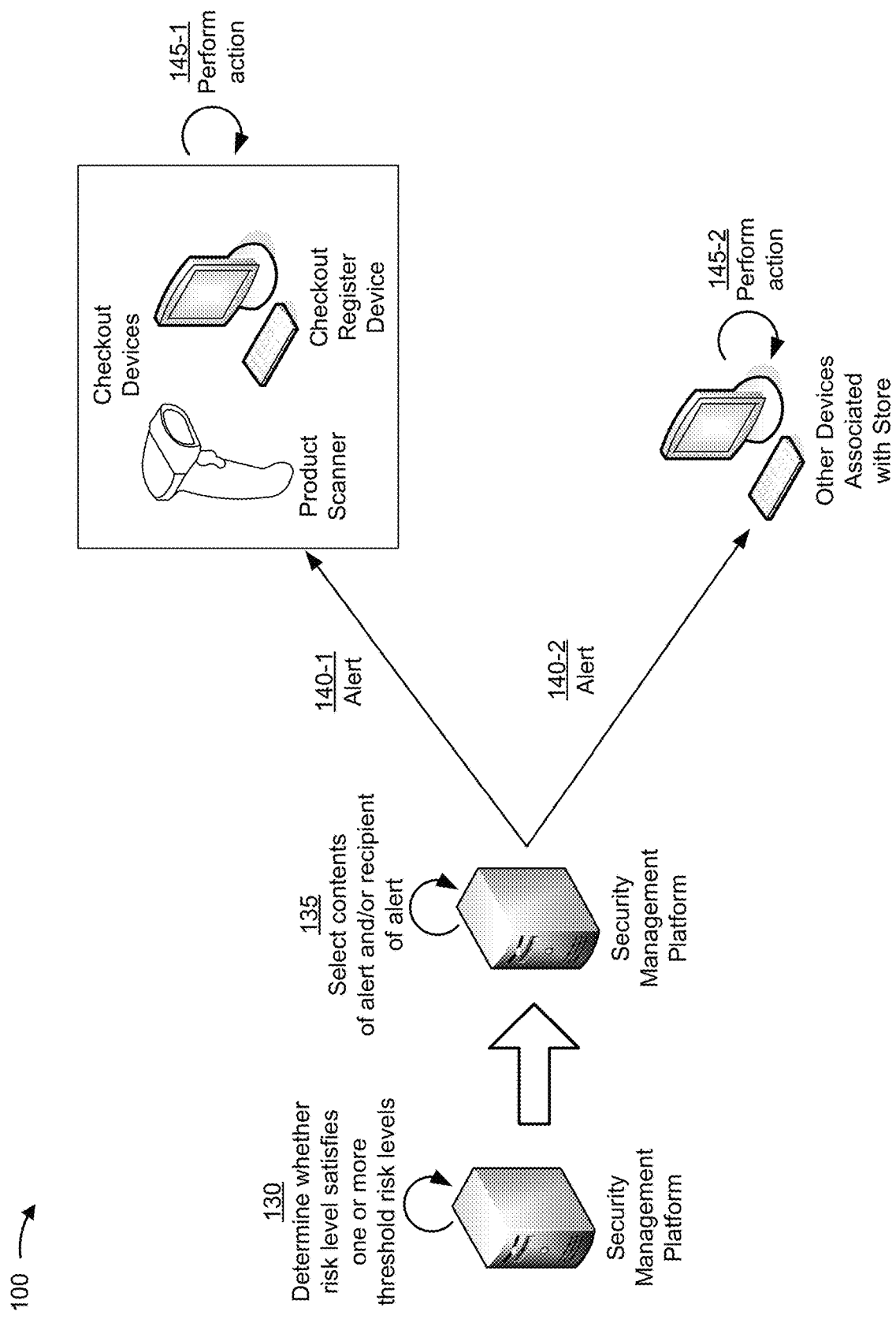

FIGS. 1A-1C are diagrams of one or more example implementations 100 described herein. Example implementation(s) 100 may include a security management platform and one or more devices associated with a store, such as a product scanner, a checkout register device (e.g., a computer used to process transactions at a checkout register), a device associated with a store manager, a device associated with a product manager, and/or the like. As shown in FIGS. 1A-1C, the security management platform may perform a security check to determine whether a product is being scanned with a correct price, whether the product is associated with a harmful act (e.g., a fraudulent transaction where a consumer attempts to mislabel the product, an erroneous transaction where the product was mislabeled during a packaging phase of the product life cycle, etc.), and/or the like.

As shown in FIG. 1A, and by reference number 105, the product scanner may scan a product that is being purchased by an individual. For example, the individual may place the product onto a designated checkout area, which may allow the product to be scanned via the product scanner.

The product scanner may be a handheld device used by an employee of the store, an automatic scanner that is built into the designated checkout area (e.g., such as a scanner that is part of a conveyor-belt that moves products to an endpoint in the designated checkout area), and/or the like. The product may be a convenience product (e.g., a disposable good, medicine, and/or the like), a shopping product (e.g., a kitchen accessory, entertainment equipment, and/or the like), a specialty product (e.g., a piece of jewelry, a piece of clothing, and/or the like), an unsought product (e.g., insurance, a warranty, and/or the like), and/or any other type of product that may be sold to a consumer.

In some implementations, the product scanner may scan a barcode affixed to the product. For example, the product scanner may scan a barcode to cause a display interface to present a purchaser with a price of the product. Additionally, or alternatively, the product scanner may scan a special tag (referred to herein as a tag) that is affixed to the product. For example, the product may have been assigned a tag that is associated with a particular price or a particular price range. The tag may be used to determine whether the product has been scanned at a correct price, as described further herein.

As shown as an example, the individual may be purchasing a mobile phone. The mobile phone may have a barcode (shown as a barcode with the numerical string 2914|7182) and a tag (shown as a tag with a blue background and with a string of text that reads "Retailer A"). As further shown, the barcode affixed to the mobile phone may in fact be a barcode assigned to a different product, such as an apple. This may be caused from a purchaser placing the barcode of the apple over (or in place of) the barcode of the mobile phone, from a mistake by an employee of the store or a manufacturer that was tasked with placing the barcode onto the product, and/or the like.

As shown by reference number 110, the checkout register device may provide, to the security management platform, image data depicting the tag of the product and/or product price data associated with the product. For example, the checkout register device may provide the image data and/or the product price data to the security management platform using a communication interface, such as an application programming interface (API) or a similar type of interface.

In this way, the security management platform receives data that may be processed as part of the security check.

As shown in FIG. 1B, and by reference number 115, the security management platform may identify the tag of the product. For example, in some cases, the reporting device may capture an image of the tag that includes the tag, one or more parts of the product, one or more aspects of the checkout area, and/or the like. In this case, the security management platform may use one or more object recognition techniques (e.g., a technique to identify an object within the image, a technique to match the object with stored objects, and/or the like) to analyze the image data to identify the tag.

As an example, the security management platform may be configured with data identifying one or more dimensions of a tag that is placed on products. In this example, the security management platform may use a first object recognition technique to identify the tag within the image data and may use a second object recognition technique (e.g., a matching technique) to verify that the identified object is in fact the tag of the product.

In some implementations, the security management platform may identify the tag using an object detection framework, such as a Viola-Jones object detection framework. For example, the security management platform may have trained an object detection framework by identifying a set of rectangular features in a frame of an image, by creating an image representation that evaluates the set of rectangular features (referred to as an integral image), by performing Adaboost training, and by generating cascading classifiers. Performing Adaboost training and generating cascading classifiers may involve the security management platform selecting best available features from the set of rectangular features and training cascading classifiers that can apply the best available features. The cascading classifiers may be said to be "strong" classifiers that represent a linear combination of weighted "weak" classifiers.

As an example, the security management platform may apply an N-rectangular feature to an image, where n indicates a number of features (e.g., edges, textures, light, etc.). In this example, the security management platform may determine features by applying a feature detection window of a specified target size to the image. For example, the security management platform may use the feature detection window to determine a feature by identifying contrasts in adjacent regions at specific locations within the feature detection window, by determining a sum of pixel intensities in each region, and by determining a difference in the sum of the pixel intensities of each region. The calculations of the pixel intensities may be made using a look-up table, which is of n*n size, and may be used to generate the sum of values in a subset of the N-rectangular feature.

Continuing with the example, during the object detection phase, the security management platform may move the feature detection window over the image, and the features for each subsection of the image (of which the feature detection window passes over) will be calculated. This process may have multiple stages, and the security management platform use an ensemble machine learning technique that takes a weighted average to combine specific features (e.g., weak features) to get a strong classifier to identify the tag. During the multiple stages, an area targeted by the feature detection window that gives negative values may be discarded to avoid false positives, and the area of the tag may be reduced. This may be repeated until the tag is identified.

As shown by reference number 120, the security management platform may identify a set of tag attributes of the tag. For example, the security management platform may identify the set of tag attributes by processing the image data depicting the tag using an attribute recognition technique (e.g., a color identification technique, a natural language processing technique, a pattern identification technique, a matching technique, a technique using computer vision, and/or the like), one or more machine learning techniques, and/or the like, as further described herein. The set of tag attributes may include a color of the tag, a type of font used for text within the tag, a font size used for the text within the tag, a particular character or sequence of characters within the text, a design of the tag (e.g., a design of the store or organization, etc.), and/or the like.

In some implementations, the security management platform may use the attribute recognition technique to identify a tag attribute. For example, the security management platform may use a color identification technique to analyze the image data to identify a color of the tag. In this case, the security management platform may consider each pixel included in the image data as a coordinate in a color space (e.g., a three-dimensional (3-D) Red-Blue-Green (RBG) color space), may cluster pixels based on the coordinates, and may identify the color of the tag based on the clustered pixels.

Additionally, or alternatively, and provided as another example, the security management platform may identify text within the tag, a font size used for the text, a type of font used for the text, and/or the like. For example, the security management platform may use an optical character recognition (OCR) technique, a syntax-based or semantic-based parsing technique, and/or a similar type of technique, to identify a font size, a type of font, a particular character or sequence of characters, and/or the like.

Additionally, or alternatively, and provided as another example, the security management platform may use a pattern identification technique and/or a matching technique to identify a design within the tag. In this example, the security management platform may compare pixels included in the image data and one or more sets of pixels stored via a data structure that represent designs associated with products (e.g., a logo of an organization that sells a product, etc.). This may allow the security management platform to identify the tag based on identifying a set of pixels that match or satisfy a threshold level of similarity with pixels included in the image data that is stored by the data structure.

Additionally, or alternatively, the security management platform may use a data model to identify the set of tag attributes. For example, the security management platform may have trained the data model by using one or more machine learning techniques to analyze historical data (e.g., historical tag data, historical product data, and/or the like) to identify tag attributes included in previously sold products. The one or more machine learning techniques may include a classification technique, a regression technique, a neural network, an anomaly detection technique, and/or the like. The data model may have been trained using a set of features that serve as indicators of a particular tag or type of tag, such as color features (e.g., tags may be different colors, different shades of the same color, etc.), features of a type of font (e.g., certain fonts may include letters with different amounts of thickness), features of a design included in the tag (e.g., an organization may have variations of a company logo displayed on tags, but the variations may share certain characteristics), and/or the like. This may allow the security management platform to identify the set of tag attributes, even in scenarios where a defect is present. As used herein, a defect may include damage to the tag (e.g., a scratch on a tag, a manufacturing defect to the tag, marker or a drawing written over the tag, another object placed at least partially over the tag, and/or the like), damage to the product (e.g., which may affect the tag or the ability of a reporting device to effectively scan the tag), an image capturing defect (e.g., resulting in a blurry image), and/or the like.

To identify the set of tag attributes, the security management platform may provide the image data depicting the tag as input to the data model to cause the data model to output a set of attribute scores. The set of attribute scores may identify a likelihood of the image data including particular attributes. Additionally, the security management platform may determine that a subset of attribute scores satisfy a threshold confidence level. The attributes associated with the subset of attributes scores may be identified as the set of tag attributes of the tag.

In some cases, the security management platform may be configured to use the data model only if one or more other techniques fail. This conserves processing resources, network resources, and/or the like, relative to always using the data model to identify the set of tag attributes (which may be more processing intensive than the other techniques).

As shown by reference number 125, the security management platform may determine a risk level associated with the tag. For example, the security management platform may determine a risk level by analyzing the set of tag attributes using a matching technique, one or more machine learning techniques, and/or the like, as further described herein. The risk level may indicate a likelihood of the tag being scanned with a correct price, a likelihood of the tag serving as an indicator that a harmful act is occurring or has occurred (e.g., product theft, a mislabeled or mispriced product, etc.), and may be represented as a set of risk scores, an average risk score of the set of risk scores, a weighted average risk score of the set of risk scores, a degree to which the set of tag attributes matches or satisfies a corresponding set of tag attributes that are stored by a data structure, and/or the like.

In some implementations, the security management platform may use the matching technique to determine the risk level. For example, the security management platform may have access to a data structure that stores data identifying one or more sets of tag attributes in association with product identifiers of products, data identifying prices or price ranges of products, and/or the like. In this case, the security management platform may compare the set of tag attributes and the one or more sets of tag attributes stored via the data structure to determine whether the set of tag attributes match or satisfy a threshold level of similarity with any of the tag attributes that are stored via the data structure. If a match is found, the security management platform may determine the risk level based on whether the price of the product (as identified in the product price data received from the reporting device) is included in a price range, or matches a corresponding price, that is stored in association with the matching tag attributes stored via the data structure.

In some implementations, the security management platform may use a data model to determine the risk level. For example, the security management platform may have trained a data model by using one or more machine learning techniques to analyze historical data (e.g., historical tag data, historical product data, and/or the like) to determine, based on particular tag attributes being input to the data model, a likelihood of the product being scanned with the correct price, a likelihood that a harmful act has occurred or will occur, and/or the like. The one or more machine learning techniques may include a classification technique, a regression technique, a technique using a neural network (e.g., a convolutional neural network (CNN)), an anomaly detection technique, and/or the like. The data model may have been trained using features similar to that described above (e.g., that serve as indicators of a particular tag or type of tag), features that relate particular tag attributes to particular price or price ranges, features that relate the particular tag attributes and/or the particular prices or price ranges to risk values or risk levels, and/or the like.

In some implementations, to identify one or more features to use when training the data model, the security management platform may analyze historical data that includes images of tags used for products that have already been sold. For example, the security management platform may analyze the images of the tags to identify a set of quadrilaterals within the images. In this case, the security management platform may identify one or more features by determining one or more values based on pixel differences between the set of quadrilaterals. The one or more values are determined using an N-number two-dimensional lookup table of matrices that have a total size equal to that of the frame of the image. This may allow the security management platform to determine a value for any position or scale within the image.

In some implementations, the security management platform may train a data model using a neural network, such as a CNN. For example, the security management platform may analyze a set of tensors using a set of convolutional layers of a CNN, a set of pooling layers of the CNN, a fully-connected layer of the CNN, a results layer of the CNN, and/or the like. For example, the security management platform may analyze the set of tensors using a first convolutional layer of the CNN by applying a filter to one or more portions of the set of tensors. The filter may be an array of numbers that represent weighted values. As the filter is applied to the set of tensors (the filter may be described as convolving around different portions of the image, or as being applied to different tensors that represent the different portions of the image), the filter may be used to multiply the one or more weighted values of the filter with the matrix of values that represent the set of tensors. The output of applying the filter to the one or more portions of the set of tensors may be a feature map. The feature map may be a matrix of values that represents, for the set of features used to train the CNN, a likelihood of certain parts of the image data (i.e., certain portions of the set of tensors) being particular features. As a specific example, if a tag of a product includes a combination of pixels that formulate a particular design, and that particular combination of pixels is a feature, the filter may be applied to the set of tensors to determine a likelihood of one or more of the set of tensors representing the combination of pixels.

Continuing with the example, the security management platform may provide the feature map generated from the first convolutional layer of the CNN as an input to a first pooling layer or to a second convolutional layer of the CNN. For example, the feature map may be provided as input to a first pooling layer to reduce a spatial size of the input data. In this case, an output of the first pooling layer may be provided as an input to a second convolutional layer.

In some cases, if the first convolutional layer identified high-level features such as a particular line within the image, or a group of lines within the image, the second convolutional layer may be used to generate a feature map with more complex features, such as semi-circles, squares, or other shapes. Each additional convolutional layer may be used to identify more complex features.

In some cases, the output of a pooling layer or a convolutional layer may be further processed using a backpropagation technique. For example, the security management platform may perform a backpropagation technique to update one or more weights that the CNN uses to generate the feature map and/or to score particular tensors while training the CNN.

Continuing with the example, the security management platform may provide an output of a final convolutional layer (e.g., a final feature map) as input to a fully connected layer to output an N-dimensional tensor where N is a number of classes that are capable of being selected. As a particular example, if there are ten different types of tag attributes that correspond to particular price ranges, the output might be an array of ten values, where each value in the array represents a likelihood of product having a particular tag attribute (and/or being part of a particular corresponding price range).

In some implementations, the security management platform may use the data model to determine the likelihood that the product is being scanned with the correct price and/or the likelihood that the harmful act may be occurring or may occur. For example, the security management platform may provide data identifying the set of tag attributes as input to the data model to cause the data model to output a set of risk values. The set of risk values may serve as indicators of the likelihood of the product being scanned with the correct price and/or as indicators of the likelihood that the harmful act is occurring or has occurred. In this case, the security management platform may use the one or more risk values to determine the risk level, such as by taking an average of the set of risk values, a weighted average, and/or the like.

As shown in FIG. 1B as an example, the security management platform may receive product price data identifying that the price of the product is 89 cents. In this example, the security management platform may identify, as the set of tag attributes, an attribute indicating that the tag has a blue background. Furthermore, the security management platform may have access to a data structure that associates four different sets of tag attributes with different price ranges. For example, the data structure may include a first set of tag attributes that includes an attribute for tags with a green background, a second set of tag attributes that includes an attribute for tags with a yellow background, a third set of tag attributes with an attribute for tags with a red background, and a fourth set of tag attributes with an attribute for tags with a blue background. Additionally, because the product price data indicated by the product scanner indicates that the product costs 89 cents (and therefore should have a green background), the security management platform may determine that the tag is associated with a high level of risk based on determining that the identified blue background is associated with a price range of $750.00 or more.

It is to be understood that the example shown is provided by way of example. In practice, any number of prices and/or price ranges may be associated with any number of different tag attributes or types of tag attributes. For example, rather than having four price ranges (shown as a first range of $0-$50, a second range of $50-$250, a third range of $250-750, and a fourth range of $750 or more), the data structure might have separate attribute and price range associations that are in increments of $10, increments of $5, increments of $1, and/or the like.

In this way, the security management platform is able to analyze the tag of the product to determine whether the product has been priced correctly, whether the product is likely to be part of a fraudulent transaction, and/or the like.

As shown in FIG. 1C, and by reference number 130, the security management platform may determine whether the risk level satisfies one or more threshold risk levels. For example, the security management platform may be configured with one or more threshold risk levels that represent ranges of risk levels. In this case, the security management platform may compare the risk level to the one or more threshold risk levels to determine whether at least one of the one or more threshold risk levels are satisfied.

In some implementations, the one or more threshold risk levels may correspond to actions that may be performed (as described in detail below). As an example, a first threshold risk level associated with a high amount of risk may be set to a risk level of 9/10, a second threshold risk level associated with a medium amount of risk may be set to a risk level of 6/10, and a third threshold risk level associated with a low amount of risk may be set to a risk level of 1/10. In this example, actions that the security management may perform may correspond to each of the three threshold risk levels, and the security management platform may perform a particular action based on which of the three threshold risk levels are satisfied.

As shown by reference number 135, the security management platform may select contents of an alert and/or a recipient that is to receive the alert. The alert may provide another device (i.e., the recipient) with an indication of whether the risk level satisfies the threshold risk level, a first set of instructions to investigate a transaction to purchase the product, a second set of instructions to stop the transaction to purchase the product, and/or the like.

In some implementations, the security management platform may select contents of the alert and/or the recipient that is to receive the alert based on whether the risk level associated with the tag satisfies a particular threshold risk level. For example, the security management platform may be configured to select a first alert and a first recipient of the alert based on the risk level satisfying the threshold risk level and may be configured to select a second alert and a second recipient of the alert based on the risk level failing to satisfy the threshold risk level.

As an example, if the risk level fails to satisfy the threshold risk level (e.g., because the product price data provided by the product scanner matches the product price range stored via the data structure), the security management platform may select the checkout register device as the recipient that is to receive the alert and may select, as the content of the alert, an indication that the risk level failed to satisfy the threshold risk level, instructions to allow the transaction to be processed, and/or the like. As another example, if the risk level satisfies the threshold risk level (e.g., because the product price data provided by the product scanner does not match the product price range stored via the data structure), the security management platform may be configured to select one or more devices and/or alerts described below.

Additionally, or alternatively, the security management platform may select an alert and/or a recipient that is to receive the alert based on a degree to which the risk level satisfies a particular threshold risk level. For example, the security management platform may be configured with a rule indicating that the greater the discrepancy in price of the product identified by the checkout register (relative to a price or price range identified via the data structure), the greater the risk. In this case, the security management platform may be configured with multiple alerts and/or multiple candidate recipients which may receive the multiple alerts and may select an alert and/or a recipient based on the degree to which the risk level satisfies the threshold risk level.

In the example shown in FIGS. 1A-1C, the product price data indicates that the product being scanned cost 89 cents. In this example, the security management platform may be configured to select a first alert and/or a first recipient if the determined risk level is associated with the product having a product price in the $50-$250 range, a second alert and/or a second recipient if the determined risk level is associated with the product having a product price in the $250-$750 range, and a third alert and/or a third recipient if the determined risk level is associated with the product having a product price in the $750 or more price range. This may allow the security management platform to select alerts and/or recipients based on a degree of risk (e.g., which, in this example, is measured by loss of revenue if the transaction is a fraudulent transaction and the product is stolen).

As shown by reference number 140-1, the security management platform may provide the alert to the checkout register device (or to another checkout device). For example, if the risk level fails to satisfy the threshold risk level (e.g., because the product price indicated by the product scanner matches the product price range stored via the data structure), the security management platform may provide the checkout register device with an alert that includes instructions that permit the transaction to be processed. As another example, if the risk level satisfies the threshold risk level (e.g., because the product price indicated by the product scanner does not match the product price range stored via the data structure), the security management platform may provide the checkout register device with instructions that prevent the transaction from being processed, that request an employee inspect the product being scanned, that request a follow-up security check to be performed to verify that the product has been scanned at a correct price (e.g., such as by analyzing an image of the actual product and comparing the scanned price to a configured product price), and/or the like.

As shown by reference number 140-2, the security management platform may provide the alert to the device associated with the store manager. For example, the security management platform may provide the alert that includes an indication of whether the risk level satisfied the threshold level, instructions indicating a likelihood of a harmful act occurring or having occurred, instructions indicating a recommendation to investigate the transaction, instructions indicating to verify whether the product was correctly tagged (e.g., during an unloading or loading process), and/or the like.

As shown by reference number 145, the devices associated with the store may perform a set of actions. For example, as shown by reference number 145-1, the checkout register device may stop a checkout procedure to prevent the consumer from purchasing the product, may trigger an alert that causes a light above the checkout register to blink (e.g., which may signal an employee to come investigate the transaction), and/or the like. As shown by reference number 145-2, a device associated with a manager of the store may perform one or more actions, such as by adding a record of the transaction to a master log of potentially fraudulent or erroneous transactions, by investigating the transaction or instructing another employee to investigate the transaction, by contacting a law enforcement agency to report an attempted theft of the product, and/or the like.

In some implementations, the security management platform may perform one or more additional actions. For example, the security management platform may generate a recommendation to modify an assignment of tag attributes to a particular type of product, may request a product scan, may request an image of the individual purchasing the product, may provide an alert to a device associated with a security officer, and/or the like, as each described below.

As an example, the security management platform may generate a recommendation to modify an assignment of tag attributes to a particular type of product. In this example, the security management platform may generate a recommendation to modify the assignment of tag attributes such as to keep consumers unaware of which tags are associated with which products. Additionally, the security management platform may provide the recommendation to a device capable of implementing the recommendation or causing the recommendation to be implemented. As a particular example, the security management platform may associate a green background with a price range of $50-$250, a yellow background with a price range of $250-$750, a red background with a price range of $750 or more, and a blue background with a price range of $50 or less. In some cases, a unique product identifier field may be added to the data structure for each product, such that the same type of product could be assigned tags with different tag attributes, but correlate to the correct price range (e.g., using the unique product identifier). In this way, the security management platform ensures that consumers are unable to learn the assignment logic used to map tag attributes to products, thereby reducing theft and conserving resources that would otherwise be used to process fraudulent transactions.

Additionally, or alternatively, and provided as another example, the security management platform may request a product scan. For example, the security management platform may provide an alert to the checkout register device that requests the product scan. In this case, the checkout register device may capture an image of the product (e.g., not just the tag of the product) and may provide the image to the security management platform. Additionally, the security management platform may use one or more techniques described elsewhere herein to identify the product, to identify the actual price of the product, and to determine a new risk level by comparing the actual price of the product to the price that was initially scanned by the product scanner. This may allow the security management platform to determine, with a high degree of confidence, whether the product was scanned with a correct price, whether the product is associated with a harmful act, and/or the like.

Additionally, or alternatively, and provided as another example, the security management platform may request an image of the individual purchasing the product. For example, the security management platform may provide a message or an alert to a camera located at or near the checkout area. This may cause the camera to capture an image of the individual and to provide the image to the security management platform, to a device accessible to a security officer, and/or the like. This conserves resources that would otherwise be wasted inefficiently attempting to identify the individual.

Additionally, or alternatively, the security management platform may provide an alert to a device accessible to a security officer. The alert may include instructions that instruct the security officer to review footage of a location of the store where the individual took the product off the shelf (e.g., so as to view whether there may be video evidence of the individual altering the tag or the barcode of the product), may instruct the security officer to investigate the checkout area by speaking to the individual before the transaction is able to be completed, and/or the like. This conserves resources that would be wasted inefficiently attempting to investigate a harmful act.

In this way, the security management platform prevents or reduces product theft. For example, the security management platform prevents or reduces product theft by identifying when a product is scanned with an incorrect tag and by performing actions to ensure that a transaction to purchase the product is not processed. This conserves resources (e.g., processing resources, network resources, and/or the like) that would otherwise be expended to process the fraudulent transaction, to identify fraud after-the-fact, to report the transaction as fraudulent, to investigate a fraudulent transaction, and/or the like.

As indicated above, FIGS. 1A-1C are provided merely as an example. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example implementation 100 may perform one or more functions described as being performed by another set of devices of example implementation 100.

FIGS. 2A-2D are diagrams of one or more example implementations 200 described herein. Example implementation(s) 200 may include a data storage device, a security management platform, and a set of devices associated with a store, such as a set of reporting devices (e.g., a set of video cameras located at parts of the store where product theft or shrinkage is common), a device associated with a store manager, a device associated with a loading dock manager, and/or the like. As shown in FIGS. 2A-2D, the security management platform may perform a security check to determine whether an individual (e.g., an employee or agent working at the store) is exhibiting emotions that increase a likelihood of the individual being involved in a harmful act.

Figure 2A:
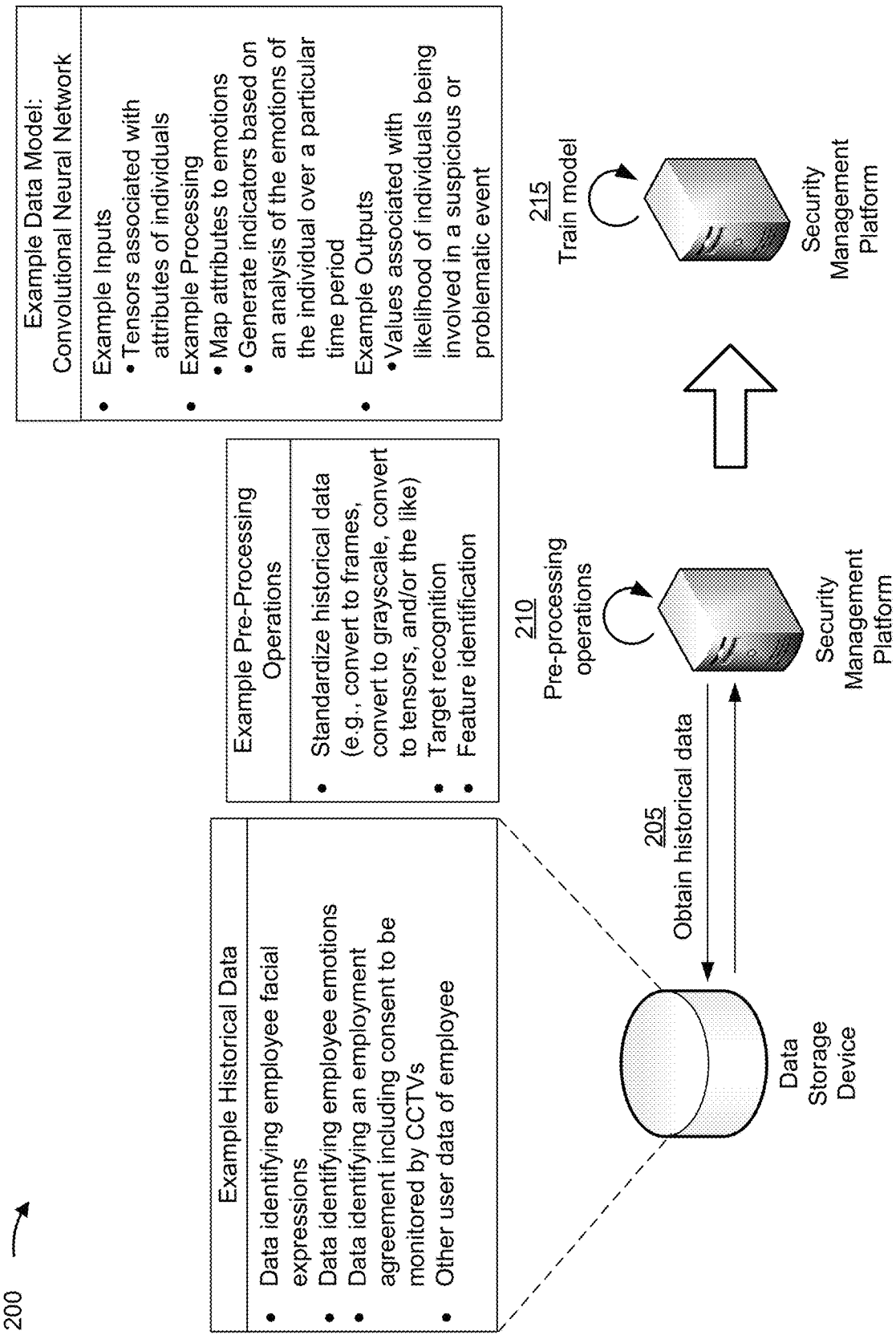
FIGS. 2A-2D are diagrams of one or more example implementations described herein.

As shown in FIG. 2A, the security management platform may train a data model to use machine learning to determine the likelihood of an individual being involved in a harmful act.

As shown by reference number 205, the security management platform may obtain historical data that is to be used to train the data model. For example, the security management platform may obtain, from the data storage device, historical image data or video data of individuals (e.g., employees, agents, independent contractors, and/or the like) that have been monitored by a security system, historical data identifying emotions of the individuals at particular time periods, data identifying that the individuals have consented to be monitored (e.g., as part of an employment agreement), other user data associated with the individuals (e.g., employment information, demographic information, etc.), and/or the like. Additionally, or alternatively, the historical data may include results data that may be used to establish correlations between emotions of the individuals and particular external events. The results data may include product shrinkage data indicating whether shrinkage was present at a particular store or location (and/or to what degree), data indicating a record of a fight, a record of a reported accusation of workplace harassment, a performance record of an employee identifying an incident that occurred during the course of employment, and/or the like.

Furthermore, to the extent one or more implementations or embodiments may describe images of individuals as being captured, stored, analyzed, and/or transmitted, it should be understood that such data is to be used in accordance with applicable laws. For example, employees monitored by an employer may be monitored only after providing consent (e.g., as part of an employment contract). As another example, storage, analysis, and/or transmission of the images may be performed in a secure manner (e.g., using one or more types of encryption, as may be required by laws of a particular jurisdiction).

As shown by reference number 210, the security management platform may perform one or more pre-processing operations. For example, the security management platform may standardize the historical data, may analyze the historical data to identify a target (e.g., an individual captured by an image or a video), may identify one or more features to use when training the data model, and/or the like, as each described below.

In some implementations, the security management platform may standardize the historical data to a uniform format. For example, the historical data may include image data that depicts individuals and multimedia data that depicts the individuals. The individuals may have been monitored while working within the store and have consented to being monitored as part of an employment agreement. In this case, the security management platform may convert the multimedia data to image data (i.e., a set of frames), such that all (or some) of the historical data is in a uniform format (i.e., frames) that may be subjected to further processing.

Additionally, or alternatively, the security management platform may eliminate one or more colors from the image data included in a frame. For example, the security management platform may convert a first frame to a second frame that includes modified image data identifying a grayscale or a black and white depiction of an individual. In this case, the security management platform may perform a color conversion technique to convert the image data (e.g., which may include pixels representing colors of a Red-Green-Blue (RGB) color scheme) to the modified image data (e.g., which may include pixels representing grayscale or black and white colors).

Additionally, or alternatively, the security management platform may identify the target (e.g., an individual) using a target recognition technique. For example, the security management platform may identify the individual using an object recognition technique, a histogram of oriented gradients (HOG) technique, a gradient vectors or tensors technique, a cascading technique, an adaptive boosting technique, and/or the like. The target recognition technique may be used to analyze the image data or the modified image data to identify an individual within a frame, to identify a face of the individual within the frame, to identify another body part of the individual (e.g., a left hand, a right hand, and/or the like), and/or the like.

As an example, the security management platform may identify an individual within a frame using an object recognition technique. In this example, the security management platform may compare clusters of pixels included in the image data to clusters of pixels that are stored using a data structure of images identifying individuals. The security management platform may identify a set of pixels that depict the individual based on the set of pixels satisfying a threshold level of similarity with pixels included in the images that are stored via the data structure.

As another example, the security management platform may identify an individual within a frame using a HOG technique. In this example, the security management platform may use the HOG technique to identify one or more sets of pixels that represent attributes of an individual (e.g., feature attributes, etc.). For example, the security management platform may use the HOG technique to identify a first set of pixels that represent a nose of an individual, a second set of pixels that represent eyes of the individual, a third set of pixels that represent a mouth of individual, and/or any other sets of pixels that may identify particular facial attributes of the individual. In this case, while performing the HOG technique, the security management platform may identify each respective set of pixels using an image gradient that identifies edges of particular facial attributes based on intensity or color of pixels in the image. Additionally, the security management platform may represent the one or more sets of pixels using a matrix of tensors. Furthermore, the security management platform may identify the individual (e.g., that an individual captured by the image is an employee of the organization) by comparing the matrix of tensors to a stored matrix of tensors for one or more employees of the organization.

In some implementations, the security management platform may identify a set of features that serve as indicators of whether an individual is more, or less, likely to be involved in a harmful act (e.g., committing or assisting in the commission of a crime). For example, the security management platform may use a feature identification technique to analyze the image data that depicts the individual, the modified image data, the set of tensors, and/or the like, to identify the set of features. The feature identification technique may include one or more of the target recognition techniques (e.g., the gradient tensors technique, the HOG technique, the SIFT technique, etc.) and/or a similar type of technique.

In some implementations, the set of features may include a feature indicating a facial expression of the individual, a feature indicating a movement or gesture made by an individual, a feature indicating a combination of movements or gestures made by the individual, and/or the like. The set of features may be represented by combinations of pixels found within the image data, by values included in the set of tensors (e.g., a value representing a magnitude, a value representing a direction, a value representing an intensity measurement, and/or the like), and/or the like. The set of features may, in some cases, correspond to particular emotions that are commonly found in individuals that are involved in a harmful act. For example, the set of features may capture physical human attributes that are commonly found in individuals that are anxious, nervous, overly stimulated, angry, scared, and/or the like.

In some implementations, the security management platform may train the data model. For example, the security management platform may use one or more machine learning techniques to train the data model to determine, based on particular input data (e.g., an image depicting an individual), a likelihood of the individual being involved in a harmful act. In this case, the data model may be trained to analyze the particular input data to identify whether the particular input data includes one or more of the set of features that serve as indicators of the likelihood of the individual being involved in the harmful act. The one or more machine learning techniques may include a classification technique, a regression technique, a neural network (e.g., a convolutional neural network (CNN)), and/or the like.

As an example, the security management platform may train a data model using a CNN. In this example, the security management platform may analyze the set of tensors using a set of convolutional layers of a CNN, a set of pooling layers of the CNN, a fully-connected layer of the CNN, a results layer of the CNN, and/or the like. For example, the security management platform may analyze the set of tensors using a first convolutional layer of the CNN by applying a filter to one or more portions of the set of tensors. The filter may be an array of numbers that represent weighted values. As the filter is applied to the set of tensors (the filter may be described as convolving around different portions of the image, or as being applied to different tensors that represent the different portions of the image), the filter may be used to multiply the one or more weighted values of the filter with the matrix of values that represent the set of tensors. The output of applying the filter to the one or more portions of the set of tensors may be a feature map. The feature map may be a matrix of values that represents, for the set of features used to train the CNN, a likelihood of certain parts of the image data (i.e., certain portions of the set of tensors) being particular features. As a specific example, if an individual's mouth contorts in a certain way during periods of high stress or anxiety, and that particular facial contortion is a feature, the filter may be applied to the set of tensors to determine a likelihood of one or more of the set of tensors representing the particular facial contortion.

Continuing with the example, the security management platform may provide the feature map generated from the first convolutional layer of the CNN as an input to a first pooling layer or to a second convolutional layer of the CNN. If the first convolutional layer identified high-level features such as a particular line within the image, or a group of lines within the image, the second convolutional layer may be used to generate a feature map with more complex features, such as semi-circles, squares, or other shapes. Each additional convolutional layer may be used to identify more complex features.

Continuing with the example, the security management platform may provide an output of a final convolutional layer (e.g., a final feature map) as input to a fully connected layer to output an N-dimensional tensor where N is a number of classes that are capable of being selected. As a particular example, if there are ten different emotions an individual might exhibit, the output might be an array of ten values, where each value in the array represents a likelihood of the individual having a particular emotion. As another example, the N-dimensional tensor may be configured with a set of risk values that represent likelihoods of a particular emotion being an indicator of the individual being involved in the harmful act.

In some implementations, the security management platform may receive a trained data model from another device. For example, a software developer may train a data model on a particular machine (e.g., a desktop computer, a laptop computer, a computing resource in a cloud computing environment, a data center computer, etc.) and may provide the trained data model to the security management platform.

In this way, the security management platform trains the data model that may be used to determine whether individuals are likely to be involved in a harmful act.

Figure 2B:
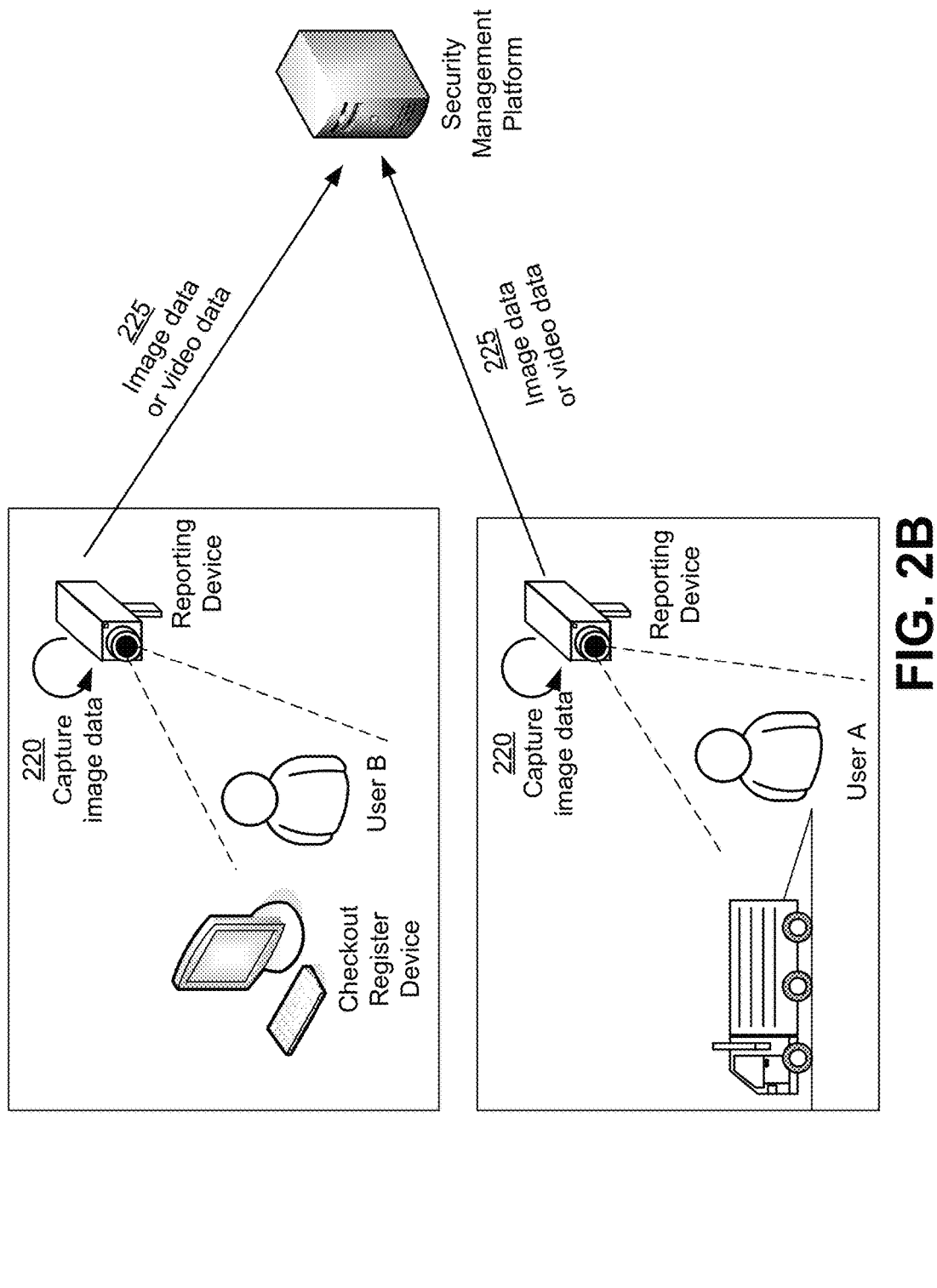

As shown in FIG. 2B, and by reference number 220, the set of reporting devices may capture image data identifying one or more individuals. For example, the set of reporting devices may be located throughout the store and may capture images or video of employees working throughout the store. The employees have consented to be being monitored, such as via an employment contract. The set of reporting devices may include a camera, a sensor, a device that is part of a closed-circuit television (CCTV) system, and/or a similar type of device. Image data, used herein, may refer to an individual image, a set of frames that are part of a video, and/or the like.

In some implementations, the set of reporting devices may be located near a critical location of the store, such as a location where fraud or shrinkage may be likely (e.g., a loading dock, a cash register, and/or the like). In some implementations, the set of reporting devices may periodically capture image data or video data (e.g., every hour, every half hour, every minute, at configurable time periods, such as when new products arrive at a loading dock, and/or the like). In some implementations, a frequency at which the set of reporting devices capture image data or video data may be different for each employee, as described further herein.

As shown by reference number 225, the set of reporting devices may provide the image data or the video data to the security management platform. For example, the set of reporting devices may provide the image data or the video data to the security management platform using a communication interface, such as an application programming interface (API) or a similar type of interface. In some implementations, the set of reporting devices may provide the image data or the video data to an intermediary device (e.g., a router, a desktop computer, a server device located at or near the store, and/or the like) and the intermediary device may provide the image data or the video data to the security management platform.

In this way, the security management platform receives the image data and/or the video data which may be processed to determine a likelihood of an individual being involved in a harmful act.

Figure 2C:
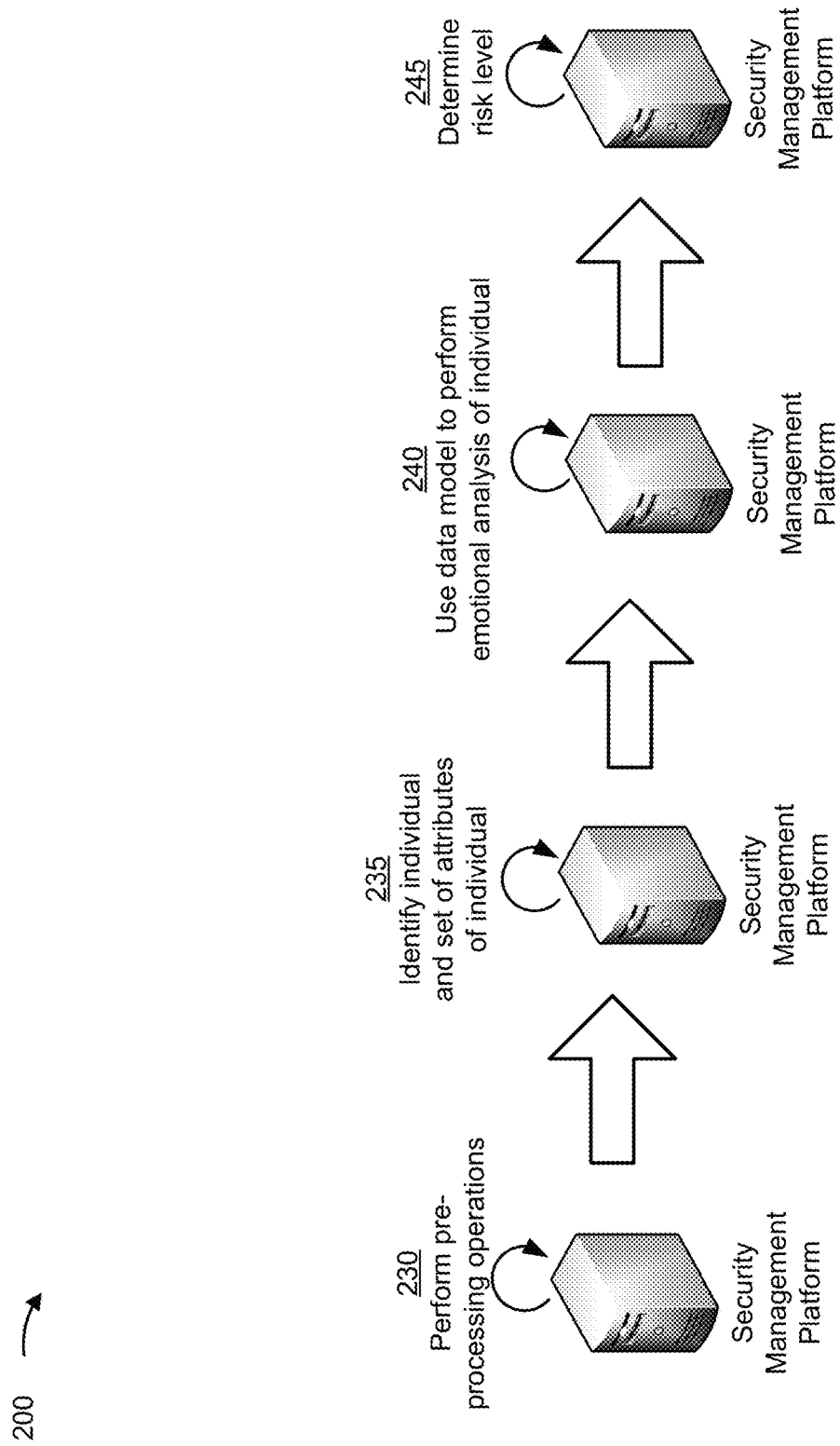

As shown in FIG. 2C, and by reference number 230, the security management platform may perform one or more pre-processing operations. For example, the security management platform may receive particular images and/or may receive video footage. In this case, the security management platform may convert the video footage to a set of frames, such that all (or some) of the image data is a uniform format (e.g., frames). Additionally, or alternatively, the security management platform may eliminate one or more colors from the image data, may convert the image data to a set of tensors, and/or the like, in the same (or in a similar) manner as that described elsewhere herein.

As shown by reference number 235, the security management platform may identify an individual depicted by the image data and/or a set of human attributes of the individual depicted by the image data. For example, the security management platform may perform the target recognition technique to identify the part of a frame that depicts an individual and a set of attributes of the individual, as described elsewhere herein.

In some implementations, the security management platform may identify which individual is depicted by the frame. For example, the security management platform may use a biometrics technique or a similar type of technique to identify that the individual is a particular employee (e.g., based on the individual having certain unique attributes that are distinguishable from other employees).

As shown by reference number 240, the security management platform may use the data model to perform an emotional analysis of the individual. For example, the security management platform may provide, as input to the data model, the image data identifying the individual, the image data identifying the set of human attributes of the individual, the set of tensors representing the individual and/or the set of human attributes of the individual, an identifier of the individual, and/or the like. In some cases, additional data may be provided as input to the data model, such as product shrinkage data for the store that the individual works at, employee scheduling data for the individual, and/or the like. This may cause the data model to output one or more risk values that serve as an indicator of the likelihood of the individual being involved with the harmful act. In this case, the data model may be used to map the set of human attributes of the individual (e.g., particular facial features, gestures, etc.) to one or more human emotions and may generate the one or more risk values based on an analysis of the human emotions over a particular time period. As an example, certain human attributes (e.g., rapid side-to-side eye movement, which may be found in an individual nervously looking around at his or her surroundings, shaking hands, and/or the like) may map to certain human emotions (e.g., fear, nervousness, anxiety, and/or the like).

The set of features identified while processing the input values may dictate which risk values are output. As an example, if products arrive at the loading dock of the store at 4:00 PM daily, and the individual exhibits anxiety and nervousness at 4:00 PM, the risk value might be a relatively low risk value if this is the first time that the individual has exhibited these emotions (e.g., because there are any number of different reasons why the individual might be exhibiting those emotions). However, if every single day at 4:00 PM, for two consecutive weeks, the individual exhibits anxiety and nervousness while working at the loading dock, and some degree of product shrinkage is present during this two-week time period, the risk value may be a higher risk value because the individual is regularly exhibiting these emotions at the same time period at which products are unloaded and moved into the store. This example is provided to illustrate some of the processing logic of the data model. In practice, the data model would consider a number of different factors that would affect the risk value. For example, if the data model is trained to consider the delivery schedule of the products, and the individual is only anxious and nervous on days where the products are late to arrive, the risk score may be lower as the anxiety and nervousness may be based on the timeliness (or lack thereof) of the products that are being delivered.

As shown by reference number 245, the security management platform may determine a risk level. For example, the security management platform may determine a risk level that represents a likelihood of the individual presently exhibiting a particular emotion, a likelihood of the individual being involved with the harmful act, and/or the like. In this case, the security management platform may determine the risk level by analyzing the risk values generated by the data model in relation to a timeline of risk values or risk levels of the individual over a particular time period. In some cases, the security management platform may consider other factors when determining the risk level. For example, if the image data indicates that the individual spilled a drink, tripped while walking, or some other event that may cause similar emotions but that may not qualify as a harmful act, the security management platform may, using the data model or another technique for processing image data, identify that another type of event has occurred which may be a cause of the emotions exhibited by the individual. This may be used to reduce an amount of weight applied to particular risk values output by the data model.

In some implementations, the determination of the risk level may be part of the processing performed by the data model. For example, rather than output the set of risk values, the data model mat be trained to output an overall risk value that represents the risk level (e.g., which may be based on the set of risk values).

In some implementations, one or more data models described herein may be improved by continuous learning. For example, the security management platform may continuously train the one or more data models described herein (e.g., using new historical data, new inputs, feedback information, and/or the like), such that the one or more data models are able to improve the accuracy of the determinations that are made.

In this way, the security management platform uses the data model to perform an emotional analysis of the individual and to determine a risk level that indicates a likelihood of the individual being involved in the harmful act.

Figure 2D:
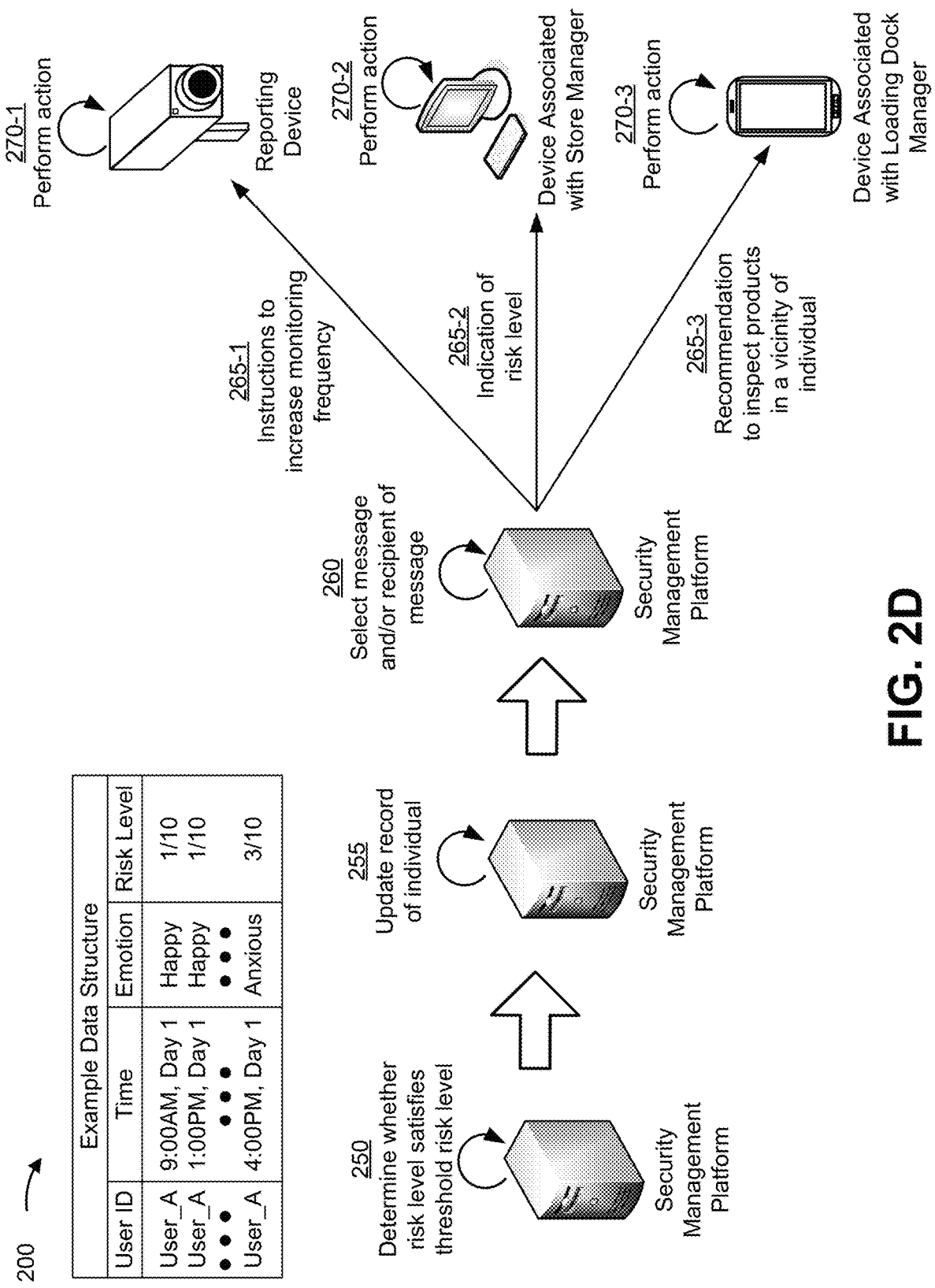

As shown in FIG. 2D, and by reference number 250, the security management platform may determine whether the risk level satisfies one or more threshold risk levels. For example, the security management platform may be configured with one or more threshold risk levels that represent ranges of risk levels. In this case, the security management platform may use the risk level and/or the one or more threshold risk levels to trigger particular actions that can be performed.

As an example, a first threshold risk level associated of a high amount of risk may be set to a risk level of 9/10, a second threshold risk level associated with a medium amount of risk may be set to a risk level of 6/10, and a third threshold risk level associated with a low amount of risk may be set to a risk level of 1/10. In this example, actions that the security management may perform may correspond to each of the three threshold risk levels, and the security management platform may perform a particular action based on which of the three threshold risk levels are satisfied.

As shown by reference number 255, the security management platform may update a data structure that stores a record of the emotional analysis of the individual over a particular time period. For example, the data structure may store a record that associates an identifier of the individual with a value identifying a time and/or a date, a value identifying an emotion, a risk level indicating the likelihood of the individual being involved in the harmful act, and/or the like.

As shown as an example, the data structure may be a database that indicates that the individual (User A) exhibited a happy emotion at 9:00 AM on a first day, a happy emotion at 1:00 PM on the first day, and anxiety at 4:00 PM on the first day. The happy emotion may have caused the security management platform to determine a low risk level (shown as 1/10 in an example scale where the value of one is a lowest possible risk level and the value of ten is a highest possible risk level). While the example shows one individual, in practice, the data structure may include records for all (or some) employees of the organization that have consented to being monitored during the ordinary course of business. Additionally, while the example shows the emotions of the individual being mapped over one day, the individual may be continued to be monitored for a week, a month, a year, and/or the like.

As shown by reference number 260, the security management platform may select a message and/or a recipient of the message. For example, the security management platform may be configured to provide a message to another device, which may cause the other device to perform one or more actions, as described further herein. In some implementations, the message may be for a reporting device and may include a first set of instructions to increase a frequency at which the individual is monitored. Additionally, or alternatively, the message may be for a device associated with a store manager, a device associated with a loading dock manager, a device associated with a law enforcement agency, and/or the like, and may include an indication of the risk level, an indication of whether the risk level satisfies a threshold risk level, a recommendation to perform an action (e.g., to inspect products in a vicinity of the individual, to request an investigation of the individual, etc.), and/or the like.

Additionally, or alternatively, the security management platform may select a message based on the risk level satisfying a particular threshold risk level. For example, the security management platform may be configured with a tie-breaker rule that dictates which message and/or recipient to select when multiple threshold risk levels are satisfied.

As shown by reference numbers 265-1, 265-2, and 265-3, the security management platform may provide the message to the other device, which, as shown by reference numbers 270-1, 270-2, and 270-3, may cause the other device to perform an action. For example, and as shown by reference number 265-1, the security management platform may provide, to a reporting device, the first set of instructions to modify the frequency at which the individual is monitored. For example, as risk level increases, or as the risk level satisfies a threshold risk level, the security management platform may provide instructions to increase a frequency at which the individual is monitored (e.g., if the reporting device captures an image or a video of the individual once an hour, the frequency might be increased to once every ten minutes, five minutes, etc.). In one example, the message, that includes the first set of instructions to increase the frequency at which the individual is monitored, may be associated with a moderate or above average risk level (e.g., enough risk to increase the monitoring frequency, but not enough risk to take immediate preventative action).

Additionally, or alternatively, and as shown by reference number 265-2, the security management platform may provide, to a device associated with a store manager, an indication of the risk level. As shown by reference number 270-2, the device associated with the store manager may display the contents of the message via a user interface. This may allow the store manager to perform a manual review to determine whether any additional actions may need to be performed.

Additionally, or alternatively, and as shown by reference number 265-3, the security management platform may provide, to a device associated with a loading dock manager, a recommendation to inspect products in a vicinity of the individual. For example, if there is a high likelihood of the individual having committed a crime, the security management platform may instruct an employee of the store to inspect products near the individual (e.g., to determine whether any of the products are missing).

The actions described herein are provided by way of example. In practice, different content may be included in the messages provided to these devices, different devices may be recipients of these messages, the recipient devices may be instructed to perform different actions, and/or the like.

In this way, the security management prevents or reduces product theft by identifying situations where an individual (e.g., an employee of an organization) exhibits behaviors or emotions that align with an increased likelihood of being involved with theft of a product (e.g., by detecting that at a certain reoccurring time period, the employee is anxious, nervous, uneasy, and/or the like). This conserves resources that would otherwise be expended to identify fraud after the fraud has occurred, to report the transaction as fraudulent, and/or the like.

As indicated above, FIGS. 2A-2D are provided merely as an example. Other examples may differ from what is described with regard to FIGS. 2A-2D. For example, there may be additional devices and/or networks, fewer devices and/or networks, different devices and/or networks, or differently arranged devices and/or networks than those shown in FIGS. 2A-2D. Furthermore, two or more devices shown in FIGS. 2A-2D may be implemented within a single device, or a single device shown in FIGS. 2A-2D may be implemented as multiple and/or distributed devices. Additionally, or alternatively, a set of devices (e.g., one or more devices) of example implementation 200 may perform one or more functions described as being performed by another set of devices of example implementation 200.

While example implementation(s) 100 and example implementation(s) 200 have been described as different implementations, one or more operations (e.g., features, steps, functions, and/or the like) performed as part of one of these implementations may be used as part of any other implementation or combination of implementations.

Figure 3:
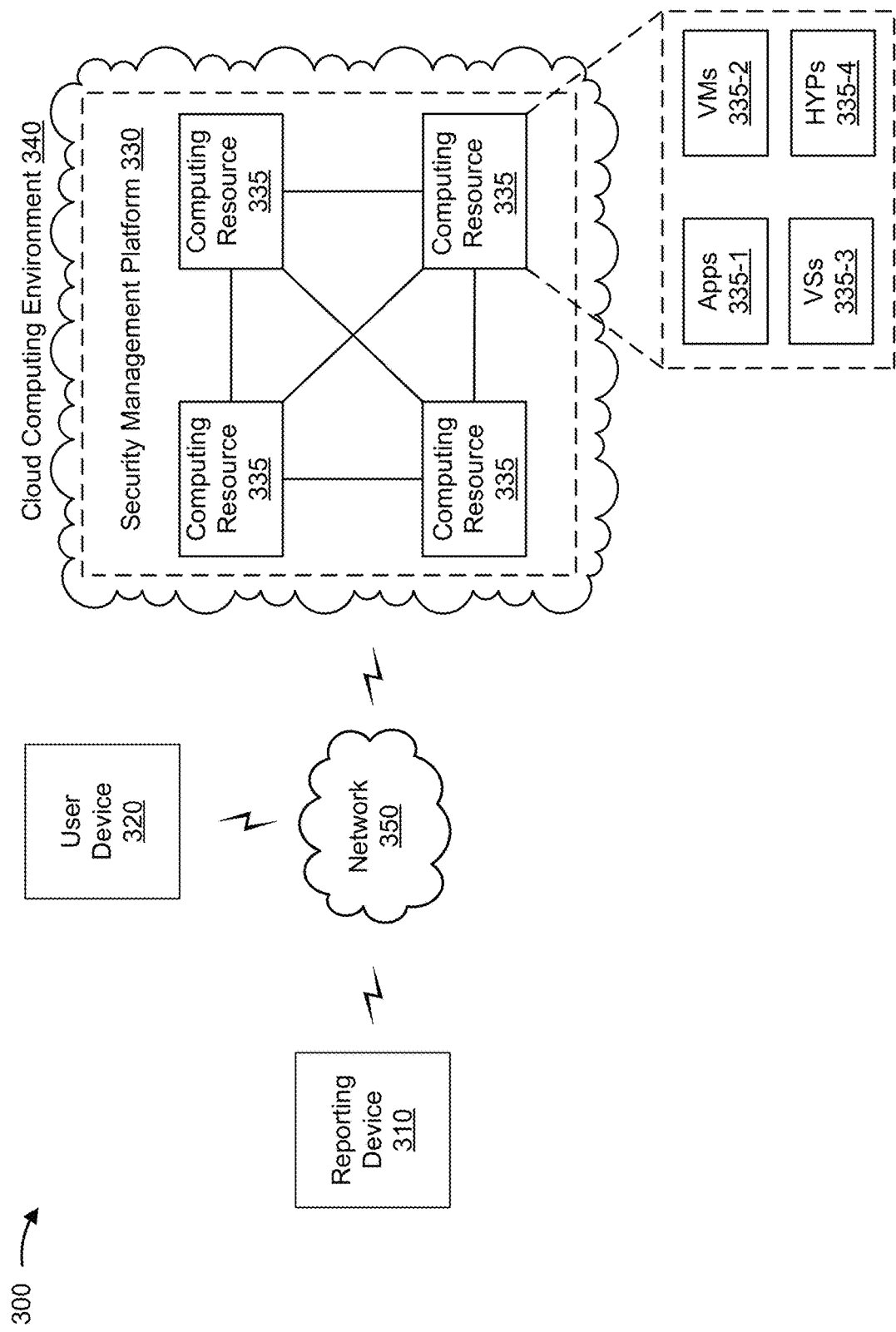
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a reporting device 310, a user device 320, a security management platform 330 hosted within a cloud computing environment 340, and/or a network 350. Devices of environment 300 may interconnect via wired connections, wireless connections, or a combination of wired and wireless connections.

Reporting device 310 includes one or more device capable of obtaining, storing, and/or providing information associated with a target. In some implementations, reporting device 310 may be a device with a sensor that is capable of detecting a target (e.g., a product, an individual, and/or the like), attributes of the target, motion or movement made by the target, and/or the like. For example, reporting device 310 may include a camera, a video recording device, a device associated with a closed-circuit television (CCTV) system, a computer (e.g., a desktop computer, a laptop computer, a server device, and/or the like), and/or the like.

In some implementations, reporting device 310 may provide image data depicting a tag of a product and/or product price data for the product to security management platform 330. In some implementations, reporting device 310 may receive an alert or a message from security management platform 330, which may cause reporting device 310 to perform one or more actions as are described elsewhere herein. In some implementations, reporting device 310 may perform one or more operations that are described herein as being performed by security management platform 330. For example, in some cases, reporting device 310 may be a high-tech camera that supports light weight data models that are able to perform the machine learning processing locally (e.g., without using security management platform 330). This conserves network resources relative to transmitting data to security management platform 330 and/or receiving data from security management platform data (e.g., via network 350).

In some implementations, reporting device 310 may receive image data from an image capturing device. For example, an image capturing device, such as a product scanner at a checkout area, may provide image data to reporting device 310 (e.g., a desktop computer at the checkout area) and reporting device 310 may provide the image data to security management platform 330.

User device 320 includes one or more devices capable of receiving, generating, storing, processing, and/or providing information associated with a target that is subject to a security check. For example, user device 320 may include a device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 320 may be a device associated with an organization that is utilizing one or more services of security management platform 330. For example, user device 320 may be a device associated with a manager of a store, a manager of a loading docket portion of a store, a device serving as a checkout register, and/or the like. In some implementations, user device 320 may receiving an alert or message from security management platform 330 and may perform one or more actions described herein based on receiving the alert or the message.

Security management platform 330 includes one or more devices capable of receiving, storing, processing, determining, and/or providing information associated with a target that is subject to a security check. For example, security management platform 330 may include a server device (e.g., a host server, a web server, an application server, etc.), a data center device, or a similar device. In some implementations, security management platform 330 may identify a target that is subject to a security check, may use machine learning to determine a likelihood of the target being involved with a harmful act, and may cause one or more other devices to perform a set of actions to reduce product theft, as further described elsewhere herein.

In some implementations, as shown, security management platform 330 may be hosted in cloud computing environment 340. Notably, while implementations described herein describe security management platform 330 as being hosted in cloud computing environment 340, in some implementations, security management platform 330 may not be cloud-based (i.e., may be implemented outside of a cloud computing environment) or may be partially cloud-based.

Cloud computing environment 340 includes an environment that hosts security management platform 330. Cloud computing environment 340 may provide computation, software, data access, storage, etc. services that do not require end-user knowledge of a physical location and configuration of system(s) and/or device(s) that hosts security management platform 330. As shown, cloud computing environment 340 may include a group of computing resources 335 (referred to collectively as "computing resources 335" and individually as "computing resource 335").

Computing resource 335 includes one or more personal computers, workstation computers, server devices, or another type of computation and/or communication device. In some implementations, computing resource 335 may host security management platform 330. The cloud resources may include compute instances executing in computing resource 335, storage devices provided in computing resource 335, data transfer devices provided by computing resource 335, and/or the like. In some implementations, computing resource 335 may communicate with other computing resources 335 via wired connections, wireless connections, or a combination of wired and wireless connections.

As further shown in FIG. 2, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, and/or the like.

Application 335-1 may include one or more software applications that may be provided to or accessed by reporting device 310 and/or user device 320. Application 335-1 may eliminate a need to install and execute the software applications on these devices. In some implementations, one application 335-1 may send/receive information to/from one or more other applications 335-1, via virtual machine 335-2. In some implementations, application 335-1 may include a security management tool. For example, application 335-1 may include a security management tool that analyzes image data to determine a likelihood of a target being involved in a harmful act. In some implementations, a single application 335-1 may support functions described in connection with FIGS. 1A-1C and FIGS. 2A-2D. In some implementations, a first application 335-1 may be used to support functions described in connection with FIGS. 1A-1C, and a second application 335-1 may be used to support functions described in connection with FIGS. 2A-2D.

Virtual machine 335-2 may include a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program and may support a single process. In some implementations, virtual machine 335-2 may execute on behalf of another device (e.g., reporting device 310, user device 320, etc.), and may manage infrastructure of cloud computing environment 340, such as data management, synchronization, or long-duration data transfers.

Virtualized storage 335-3 may include one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 may provide hardware virtualization techniques that allow multiple operating systems (e.g., "guest operating systems") to execute concurrently on a host computer, such as computing resource 335. Hypervisor 335-4 may present a virtual operating platform to the guest operating systems and may manage the execution of the guest operating systems.

Network 350 includes one or more wired and/or wireless networks. For example, network 350 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400. Device 400 may correspond to reporting device 310, user device 320, and/or security management platform 330. In some implementations, reporting device 310, user device 320, and/or security management platform 330 may include one or more devices 400 and/or one or more components of device 400. As shown in FIG. 4, device 400 may include a bus 410, a processor 420, a memory 430, a storage component 440, an input component 450, an output component 460, and/or a communication interface 470.

Bus 410 includes a component that permits communication among multiple components of device 400. Processor 420 may be implemented in hardware, firmware, and/or a combination of hardware and software. Processor 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 described herein. In some implementations, one or more process blocks of FIG. 5 may be performed by a security management platform (e.g., security management platform 330). In some implementations, one or more process blocks of FIG. 5 may be performed by another device or a group of devices separate from or including a reporting device (e.g., reporting device 310), a user device (e.g., user device 320), and/or the like.

As shown in FIG. 5, process 500 may include receiving, from a reporting device, image data that depicts a target that is subject to a security check, wherein the target is: a tag of a product that is to be purchased, or an individual (block 510). For example, the security management platform (e.g., using computing resource 335, processor 420, memory 430, storage component 440, input component 450, communication interface 470, and/or the like) may receive, from a reporting device (e.g., reporting device 310), image data that depicts a target that is subject to a security check, as described above. In some implementations, the target may be a tag of a product that is to be purchased, or an individual.

As further shown in FIG. 5, process 500 may include identifying the target by using a target recognition technique to analyze image data (block 520). For example, the security management platform (e.g., using computing resource 335, processor 420, memory 430, storage component 440, and/or the like) may identify the target by using a target recognition technique to analyze image data, as described above.

As further shown in FIG. 5, process 500 may include identifying a set of target attributes of the target (block 530). For example, the security management platform (e.g., using computing resource 335, processor 420, memory 430, storage component 440, and/or the like) may identify a set of target attributes of the target, as described above.

As further shown in FIG. 5, process 500 may include selecting a data model to use for the security check based on whether the target is the tag of the product, or the individual, wherein the data model has been trained using one or more machine learning techniques (block 540). For example, the security management platform (e.g., using computing resource 335, processor 420, memory 430, storage component 440, and/or the like) may select a data model to use for the security check based on whether the target is the tag of the product, or the individual, as described above. In some implementations, the data model may have been trained using one or more machine learning techniques. In some cases, the security management platform may select a data model described in connection with FIGS. 1A-1C. In other cases, the security management platform may select a data model described in connection with FIGS. 2A-2D.

As further shown in FIG. 5, process 500 may include determining, as part of the security check, a risk level associated with the target by using the data model to analyze the set of target attributes, wherein determining the risk level includes: determining a likelihood of the product being scanned with a correct price, or determining, based on one or more emotions of the individual, a likelihood of the individual being involved with a harmful act (block 550). For example, the security management platform (e.g., using computing resource 335, processor 420, memory 430, storage component 440, and/or the like) may determine, as part of the security check, a risk level associated with the target by using the data model to analyze the set of target attributes, as described above. In some implementations, determining the risk level may include determining a likelihood of the product being scanned with a correct price, or determining, based on one or more emotions of the individual, a likelihood of the individual being involved with a harmful act.

As further shown in FIG. 5, process 500 may include determining whether the risk level satisfies one or more threshold risk levels (block 560). For example, the security management platform (e.g., using computing resource 335, processor 420, memory 430, storage component 440, and/or the like) may determine whether the risk level satisfies one or more threshold risk levels, as described above.

As further shown in FIG. 5, process 500 may include providing an alert to another device to cause the other device to perform a set of actions, wherein the alert is selected based on whether the risk level satisfies at least one of the one or more threshold risk levels, and wherein the set of actions include: a first subset of actions that are indicative of the risk level being associated with a low amount of risk, or a second subset of actions that are indicative of the risk level being associated with a high amount of risk and that are associated with assisting in prevention of a fraudulent transaction involving the product or that are associated with assisting in prevention of the harmful act (block 570). For example, the security management platform (e.g., using computing resource 335, processor 420, memory 430, storage component 440, input component 450, output component 460, communication interface 470, and/or the like) may provide an alert to another device to cause the other device to perform a set of actions. In some implementations, the set of actions may include a first subset of actions that are indicative of the risk level being associated with a low amount of risk, or a second subset of actions that are indicative of the risk level being associated with a high amount of risk and that are associated with assisting in prevention of a fraudulent transaction involving the product or that are associated with assisting in prevention of a type of crime.

Process 500 may include additional implementations, such as any single implementation or any combination of implementations described below and/or in connection with one or more other processes described elsewhere herein.

In some implementations, the image data that depicts the target may be particular image data that is part of an image or a video, and the security management platform may convert image data for the image or the video to a set of tensors. The image data for the image or the video may include the particular image data. In some implementations, when identifying the target, the security management platform may identify a subset of tensors that represent the target by using the target recognition technique to analyze the set of tensors. In some implementations, when identifying the set of target attributes, the security management platform may identify the set of target attributes by using the data model to analyze the subset of tensors.

In some implementations, the target may be the tag of the product, where the set of target attributes are a first set of tag attributes, and where the first set of tag attributes include at least one of: a color of the tag, a type of font used for text within the tag, a font size used for the text within the tag, a set of characters that are part of the text, or a design of the tag.

In some implementations, the target may be the tag of the product, the set of target attributes may be a first set of tag attributes, the security management platform may receive product price data indicating a price of the product. In some implementations, when determining the risk level, the security management platform may determine that the first set of tag attributes matches or satisfies a threshold level of similarity with a second set of tag attributes that are stored in association with one or more values that represent a price range that includes the price indicated by the product price data. In some implementations, the security management platform may determine the risk level based on determining that the first set of tag attributes matches or satisfies the threshold level of similarity with the second set of tag attributes. The first set of tag attributes matching or satisfying the threshold level of similarity with the second set of tag attributes may serve as an indicator of the product being scanned with the correct price.

In some implementations, the target may be the individual. the set of target attributes may be a first set of human attributes, and the first set of human attributes may include at least one of: one or more eyes of the individual, a mouth of the individual, one or more hands of the individual, or a body of the individual.

In some implementations, the target may be the individual, the set of target attributes may be a first set of human attributes, and, when determining the risk level, the security management platform may provide data identifying the first set of human attributes as input to the data model to cause the data model to output one or more risk values that serve as an indicator of the likelihood of the individual to commit the type of crime. The data model may use a neural network to map the first set of human attributes to one or more human emotions, to generate the one or more risk values based on an analysis of the human emotions of the individual over a particular time period, and to determine the risk level based on the one or more risk values.

In some implementations, the security management platform may determine a degree to which the risk level satisfies the one or more threshold risk levels. In some implementations, the security management platform may select content for the alert that is to be provided to the other device based on a type of target and based on the degree to which the risk level satisfies at least one of the one or more threshold risk levels. The content may include at least one of: an indication of whether the risk level satisfies at least one of the one or more threshold risk levels, a first set of instructions to investigate a transaction to purchase the product, a second set of instructions to stop the transaction to purchase the product, a third set of instructions to modify a frequency at which the individual is monitored, or a fourth set of instructions to request an investigation of the individual. In some implementations, the security management platform may provide the other device with the alert that includes the content to cause the other device to perform the set of actions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
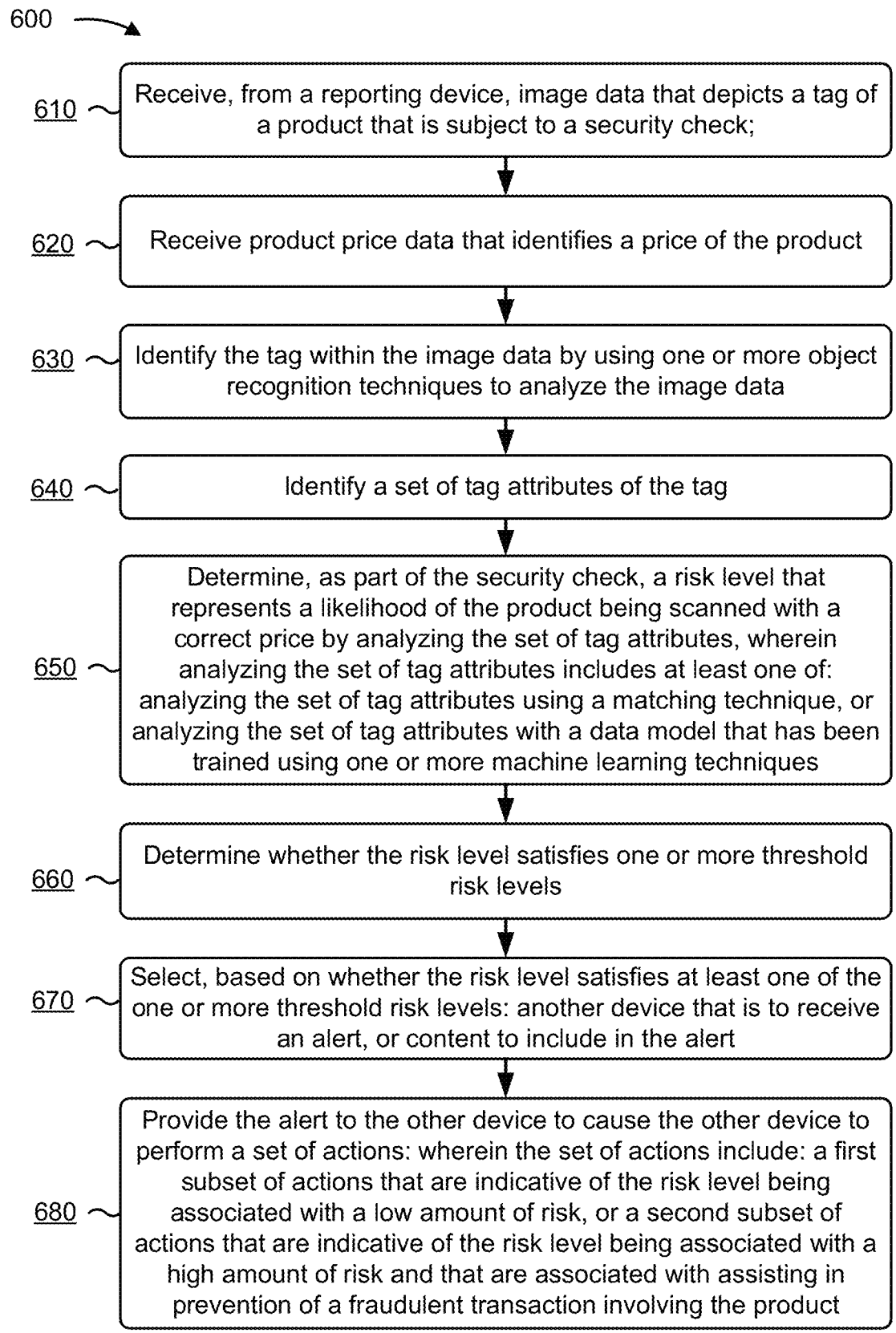

FIG. 6 is a flow chart of an example process 600 described herein. In some implementations, one or more process blocks of FIG. 6 may be performed by a security management platform (e.g., security management platform 330). In some implementations, one or more process blocks of FIG. 6 may be performed by another device or a group of devices separate from or including the security management platform, such as a reporting device (e.g., reporting device 310), a user device (e.g., user device 320), and/or the like.

As shown in FIG. 6, process 600 may include receiving, from a reporting device, image data that depicts a target that is subject to a security check (block 610). For example, the security management platform (e.g., using computing resource 335, processor 420, memory 430, storage component 440, input component 450, communication interface 470, and/or the like) may receive from a reporting device (e.g., reporting device 310), image data that depicts a target that is subject to a security check, as described above.

As further shown in FIG. 6, process 600 may include receiving transactional data that identifies a characteristic of a transaction associated with the target (block 620). For example, the security management platform (e.g., using computing resource 335, processor 420, memory 430, storage component 440, input component 450, communication interface 470, and/or the like) may receive transactional data that identifies a characteristic of a transaction associated with the target, as described above.

As further shown in FIG. 6, process 600 may include identifying the target within the image data by using one or more object recognition techniques to analyze the image data (block 630). For example, the security management platform (e.g., using computing resource 335, processor 420, memory 430, storage component 440, input component 450, communication interface 470, and/or the like) may identify the target within the image data by using one or more object recognition techniques to analyze the image data, as described above.

As further shown in FIG. 6, process 600 may include identifying a set of target attributes of the tag (block 640). For example, the security management platform (e.g., using computing resource 335, processor 420, memory 430, storage component 440, and/or the like) may identify a set of target attributes of the tag, as described above.

As further shown in FIG. 6, process 600 may include determining, as part of the security check, a risk level that represents a likelihood of the characteristic of the transaction having a correct value by analyzing the set of target attributes, wherein analyzing the set of target attributes includes at least one of: analyzing the set of target attributes using one or more attribute recognition techniques, or analyzing the set of target attributes with a data model that has been trained using one or more machine learning techniques (block 650). For example, the security management platform (e.g., using computing resource 335, processor 420, memory 430, storage component 440, and/or the like) may determine, as part of the security check, a risk level that represents a likelihood of the characteristic of the transaction having a correct value by analyzing the set of target attributes, as described above. In some implementations, analyzing the set of target attributes may include at least one of: analyzing the set of target attributes using a matching technique, or analyzing the set of target attributes with a data model that has been trained using one or more machine learning techniques.

As further shown in FIG. 6, process 600 may include determining whether the risk level satisfies one or more threshold risk levels (block 660). For example, the security management platform (e.g., using computing resource 335, processor 420, memory 430, storage component 440, and/or the like) may determine whether the risk level satisfies one or more threshold risk levels, as described above.

As further shown in FIG. 6, process 600 may include selecting, based on whether the risk level satisfies at least one of the one or more threshold risk levels: another device that is to receive an alert, or content to include in the alert (block 660). For example, the security management platform (e.g., using computing resource 335, processor 420, memory 430, storage component 440, and/or the like) may select, based on whether the risk level satisfies at least one of the one or more threshold risk levels: another device that is to receive an alert, or content to include in the alert, as described above.

As further shown in FIG. 6, process 600 may include providing the alert to the other device to cause the other device to perform a set of actions, wherein the set of actions include a first subset of actions that are indicative of the risk level being associated with a low amount of risk, or a second subset of actions that are indicative of the risk level being associated with a high amount of risk and that are associated with assisting in prevention of a fraudulent transaction involving the product (block 680). For example, the security management platform (e.g., using computing resource 335, processor 420, memory 430, storage component 440, output component 460, communication interface 470, and/or the like) may provide the alert to the other device to cause the other device to perform a set of actions, as described above. The set of actions may include a first subset of actions that are indicative of the risk level being associated with a low amount of risk, or a second subset of actions that are indicative of the risk level being associated with a high amount of risk and that are associated with assisting in prevention of a fraudulent transaction involving the product.

Process 600 may include additional implementations, such as any single implementation or any combination of implementations described below and/or in connection with one or more other processes described elsewhere herein.

In some implementations, the set of tag attributes may be a first set of tag attributes. In some implementations, when determining the risk level, the security management platform may determine, using a matching technique that is part of the one or more attribute recognition techniques, that the first set of tag attributes matches or satisfies a threshold level of similarity with a second set of tag attributes that are stored in association with one or more values that represent a price range that includes the price indicated by the product price data. In some implementations, the security management platform may determine the risk level based on determining that the first set of tag attributes matches or satisfies the threshold level of similarity with the second set of tag attributes, where the first set of tag attributes matching or satisfying the threshold level of similarity with the second set of tag attributes serves as an indicator of the product being scanned with the correct price.

In some implementations, when determining the risk level, the security management platform may provide data identifying the set of tag attributes and the product price data as inputs to the data model to cause the data model to output a set of risk values that represent likelihoods of the product being scanned with the correct price. The data model may have been trained using a set of features that include at least one of: a subset of features of particular tag attributes, a subset of features that relate the particular tag attributes to particular prices or price ranges, or a subset of features that relate the particular tag attributes to particular risk values. Additionally, the security management platform may determine the risk level based on the set of risk values.

In some implementations, the security management platform may determine to analyze the set of tag attributes with the data model rather than using a matching technique, that is part of the one or more attribute recognition techniques, when a defect is present that would prevent the matching technique from being able to determine the risk level.

In some implementations, the image data that depicts the tag may be particular image data that is part of an image, and the security management platform may convert image data for the image to a set of tensors, where the image data for the image includes the particular image data. In some implementations, identifying the tag may include identifying a subset of tensors that represent the tag by using the one or more object recognition techniques to analyze the set of tensors, and where identifying the set of tag attributes includes identifying the set of tag attributes by using the data model or another data model to analyze the subset of tensors.

In some implementations, the set of tag attributes may include a color of the tag, a type of font used for text within the tag, a font size used for the text within the tag, a set of one or more characters that are part of the text, and/or a design of the tag.

In some implementations, the security management platform may determine a degree to which the risk level satisfies the one or more threshold risk levels and may select content for the alert that is to be provided to the other device based on a type of product or based on the degree to which the risk level satisfies at least one of the one or more threshold risk levels. The content may include an indication of whether the risk level satisfies at least one of the one or more threshold risk levels, a first set of instructions to investigate a transaction to purchase the product, and/or a second set of instructions to stop the transaction to purchase the product. In some implementations, when providing the other device with the alert, the security management platform may provide the other device with the alert that includes the content to cause the other device to perform the set of actions.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
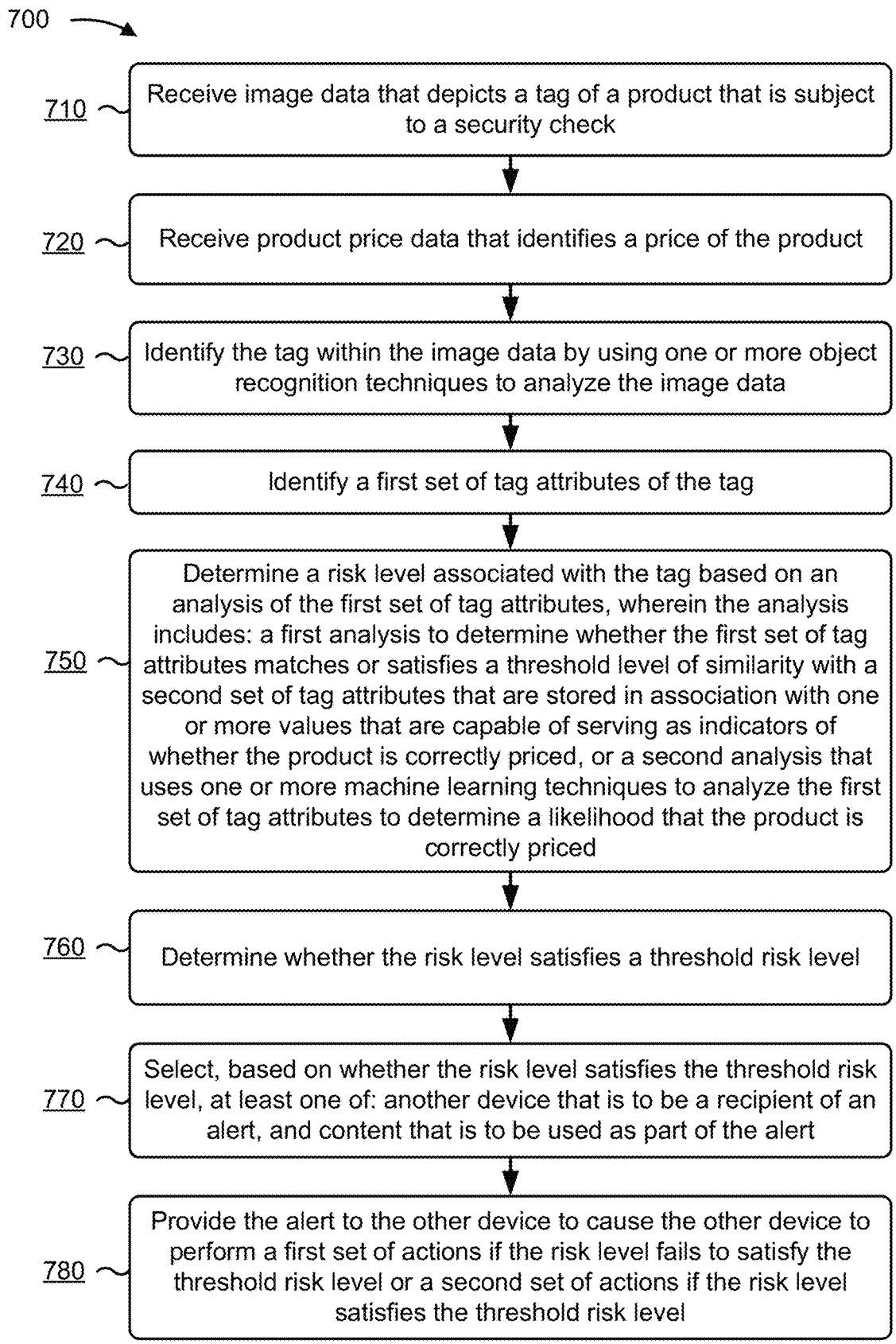

FIG. 7 is a flow chart of an example process 700 described herein. In some implementations, one or more process blocks of FIG. 7 may be performed by a security management platform (e.g., security management platform 330). In some implementations, one or more process blocks of FIG. 7 may be performed by another device or a group of devices separate from or including the security management platform, such as a reporting device (e.g., reporting device 310), a user device (e.g., user device 320), and/or the like.

As shown in FIG. 7, process 700 may include receiving image data that depicts a tag of a product that is subject to a security check (block 710). For example, the security management platform (e.g., using computing resource 335, processor 420, memory 430, storage component 440, input component 450, communication interface 470, and/or the like) may receive image data that depicts a tag of a product that is subject to a security check, as described above.

As further shown in FIG. 7, process 700 may include receiving product price data that identifies a price of the product (block 720). For example, the security management platform (e.g., using computing resource 335, processor 420, memory 430, storage component 440, input component 450, communication interface 470, and/or the like) may receive product price data that identifies a price of the product, as described above.

As further shown in FIG. 7, process 700 may include identifying the tag within the image data by using one or more object recognition techniques to analyze the image data (block 730). For example, the security management platform (e.g., using computing resource 335, processor 420, memory 430, storage component 440, and/or the like) may identify the tag within the image data by using one or more object recognition techniques to analyze the image data, as described above.

As further shown in FIG. 7, process 700 may include identifying a first set of tag attributes of the tag (block 740). For example, the security management platform (e.g., using computing resource 335, processor 420, memory 430, storage component 440, and/or the like) may identify a first set of tag attributes of the tag, as described above.

As further shown in FIG. 7, process 700 may include determining a risk level associated with the tag based on an analysis of the first set of tag attributes, wherein the analysis includes a first analysis to determine whether the first set of tag attributes matches or satisfies a threshold level of similarity with a second set of tag attributes that are stored in association with one or more values that are capable of serving as indicators the product being priced correctly, or a second analysis that uses one or more machine learning techniques to analyze the first set of tag attributes to determine a likelihood that the product is priced correctly (block 750). For example, the security management platform (e.g., using computing resource 335, processor 420, memory 430, storage component 440, and/or the like) may determine a risk level associated with the tag based on an analysis of the first set of tag attributes, as described above. In some implementations, the analysis may include a first analysis to determine whether the first set of tag attributes matches or satisfies a threshold level of similarity with a second set of tag attributes that are stored in association with one or more values that are capable of serving as indicators of the product being priced correctly, or a second analysis that uses one or more machine learning techniques to analyze the first set of tag attributes to determine a likelihood that the product is priced correctly.

As further shown in FIG. 7, process 700 may include determining whether the risk level satisfies a threshold risk level (block 760). For example, the security management platform (e.g., using computing resource 335, processor 420, memory 430, storage component 440, and/or the like) may determine whether the risk level satisfies a threshold risk level, as described above.

As further shown in FIG. 7, process 700 may include selecting, based on whether the risk level satisfies the threshold risk level, at least one of: another device that is to be a recipient of an alert, and content that is to be used as part of the alert (block 770). For example, the security management platform (e.g., using computing resource 335, processor 420, memory 430, storage component 440, and/or the like) may select, based on whether the risk level satisfies the threshold risk level, at least one of: another device that is to be a recipient of an alert, and content that is to be used as part of the alert, as described above.

As further shown in FIG. 7, process 700 may include providing the alert to the other device to cause the other device to perform a first set of actions if the risk level fails to satisfy the threshold risk level or a second set of actions if the risk level satisfies the threshold risk level (block 780). For example, the security management platform (e.g., using computing resource 335, processor 420, memory 430, storage component 440, input component 450, communication interface 470, and/or the like) may provide the alert to the other device to cause the other device to perform a first set of actions if the risk level fails to satisfy the threshold risk level or a second set of actions if the risk level satisfies the threshold risk level, as described above.

Process 700 may include additional implementations, such as any single implementation or any combination of implementations described below and/or in connection with one or more other processes described elsewhere herein.

In some implementations, the security management platform may include a sensor that is to capture the image data that depicts the tag. some implementations, the security management platform may provide the image data to the one or more processors. In some implementations, when determining the risk level, the security management platform may determine that the first set of tag attributes matches or satisfies the threshold level of similarity with the second set of tag attributes that are stored in association with particular values that are indicators of a price range that includes the price indicated by the product price data.

In some implementations, when determining the risk level, the security management platform may provide, as part of the second analysis, data identifying the set of tag attributes and the product price data as inputs to a data model to cause the data model to output a set of risk values that represent likelihoods of the product being priced correctly, wherein the data model has been trained using the one or more machine learning techniques. In some implementations, the security management platform may determine the risk level based on the set of risk values. In some implementations, the security management platform may determine to analyze the set of tag attributes with the data model rather than using the one or more attribute recognition techniques when a defect is present that would prevent the one or more attribute recognition techniques from being able to determine the risk level.

In some implementations, the image data that depicts the tag may be particular image data that is part of an image, and the security management platform may convert image data for the image to a set of tensors. The image data for the image may include the particular image data. In some implementations, when identifying the tag, the security management platform may identify a subset of tensors that represent the tag by using the one or more object recognition techniques to analyze the set of tensors, and, when identifying the first set of tag attributes, the security management platform may identify the first set of tag attributes by using a neural network to analyze the subset of tensors.

In some implementations, when providing the other device with the alert, the security management platform may provide the other device with the alert that includes the content that has been selected. The content may include an indication of whether the risk level satisfies the threshold risk level, a first set of instructions to investigate a transaction to purchase the product, and/or a second set of instructions to stop the transaction to purchase the product.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
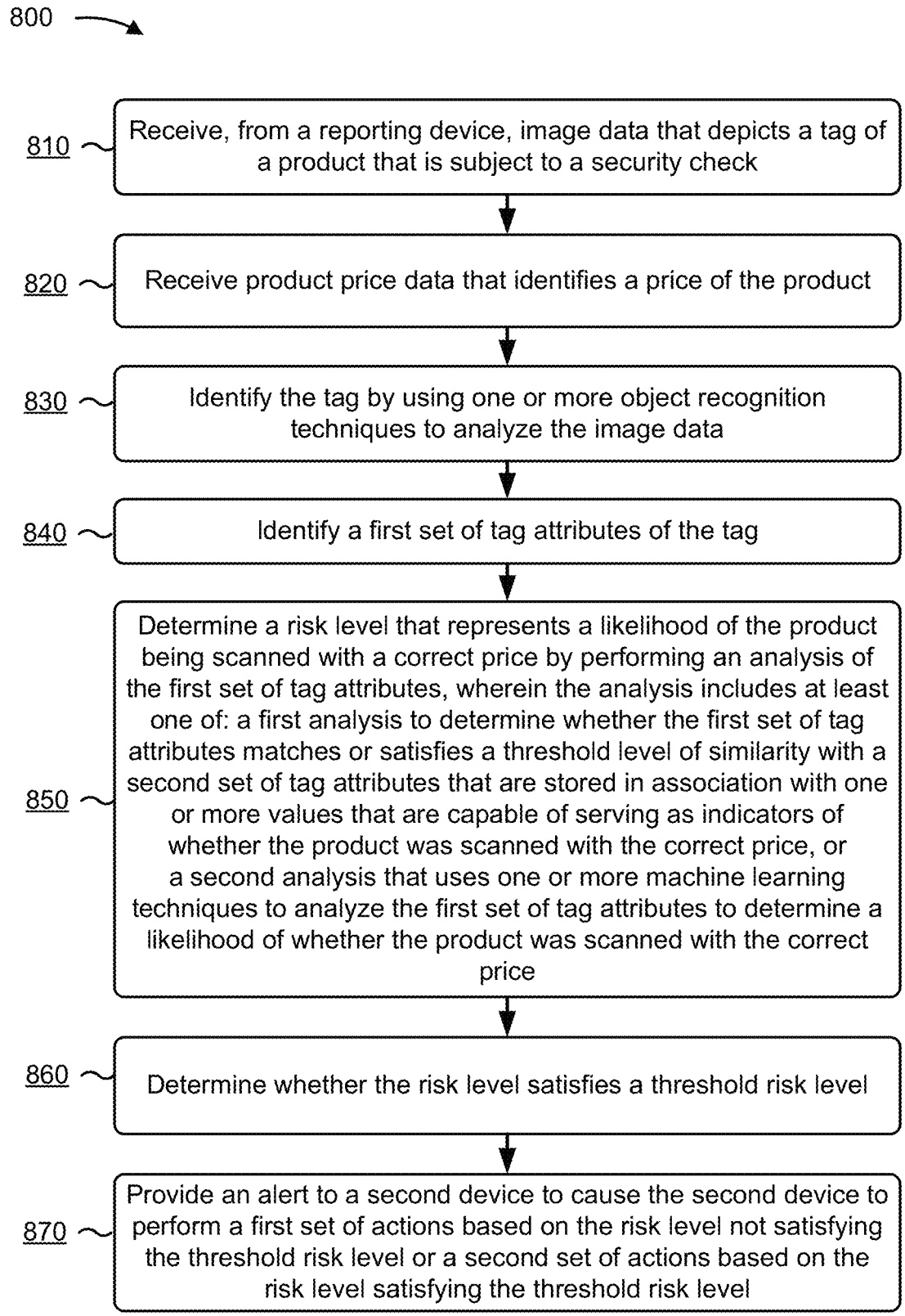

FIG. 8 is a flow chart of an example process 800 described herein. In some implementations, one or more process blocks of FIG. 8 may be performed by a security management platform (e.g., security management platform 330). In some implementations, one or more process blocks of FIG. 8 may be performed by another device or a group of devices separate from or including the security management platform, such as a reporting device (e.g., reporting device 310), a user device (e.g., user device 320), and/or the like.

As shown in FIG. 8, process 800 may include receiving, from a reporting device, image data that depicts a tag of a product that is subject to a security check (block 810). For example, the security management platform (e.g., using computing resource 335, processor 420, memory 430, storage component 440, input component 450, communication interface 470, and/or the like) may receive, from a reporting device, image data that depicts a tag of a product that is subject to a security check, as described above.

As further shown in FIG. 8, process 800 may include receiving product price data that identifies a price of the product (block 820). For example, the security management platform (e.g., using computing resource 335, processor 420, memory 430, storage component 440, input component 450, communication interface 470, and/or the like) may receive product price data that identifies a price of the product, as described above.

As further shown in FIG. 8, process 800 may include identifying the tag by using one or more object recognition techniques to analyze the image data (block 830). For example, the security management platform (e.g., using computing resource 335, processor 420, memory 430, storage component 440, and/or the like) may identify the tag by using one or more object recognition techniques to analyze the image data, as described above.

As further shown in FIG. 8, process 800 may include identifying a first set of tag attributes of the tag (block 840). For example, the security management platform (e.g., using computing resource 335, processor 420, memory 430, storage component 440, and/or the like) may identify a first set of tag attributes of the tag, as described above.

As further shown in FIG. 8, process 800 may include determining a risk level that represents a likelihood of the product being scanned with a correct price by performing an analysis of the first set of tag attributes, wherein the analysis includes at least one of: a first analysis to determine whether the first set of tag attributes matches or satisfies a threshold level of similarity with a second set of tag attributes that are stored in association with one or more values that are capable of serving as indicators of whether the product was scanned with the correct price, or a second analysis that uses one or more machine learning techniques to analyze the first set of tag attributes to determine a likelihood of whether the product was scanned with the correct price (block 850). For example, the security management platform (e.g., using computing resource 335, processor 420, memory 430, storage component 440, and/or the like) may determine a risk level that represents a likelihood of the product being scanned with a correct price by performing an analysis of the first set of tag attributes, as described above. In some implementations, the analysis may include at least one of: a first analysis to determine whether the first set of tag attributes matches or satisfies a threshold level of similarity with a second set of tag attributes that are stored in association with one or more values that are capable of serving as indicators of whether the product was scanned with the correct price, or a second analysis that uses one or more machine learning techniques to analyze the first set of tag attributes to determine a likelihood of whether the product was scanned with the correct price.

As further shown in FIG. 8, process 800 may include determining whether the risk level satisfies a threshold risk level (block 860). For example, the security management platform (e.g., using computing resource 335, processor 420, memory 430, storage component 440, and/or the like) may determine whether the risk level satisfies a threshold risk level, as described above.

As further shown in FIG. 8, process 800 may include providing an alert to a second device to cause the second device to perform a first set of actions based on the risk level not satisfying the threshold risk level or a second set of actions based on the risk level satisfying the threshold risk level (block 870). For example, the security management platform (e.g., using computing resource 335, processor 420, memory 430, storage component 440, output component 460, communication interface 470, and/or the like) may provide an alert to a second device to cause the second device to perform a first set of actions based on the risk level not satisfying the threshold risk level or a second set of actions based on the risk level satisfying the threshold risk level, as described above.

Process 800 may include additional implementations, such as any single implementation or any combination of implementations described below and/or in connection with one or more other processes described elsewhere herein.

In some implementations, the security management platform may include a sensor that is to capture the image data that depicts the tag and may provide the image data to the one or more processors. In some implementations, the image data that depicts the tag may be particular image data that is part of an image or a video, and the security management platform may convert image data for the image or the video to a set of tensors. The image data for the image or the video may include the particular image data, and, when identifying the first set of tag attributes, the security management platform may identify a subset of tensors that represent the tag by using the one or more object recognition techniques to analyze the set of tensors. In some implementations, when identifying the first set of tag attributes, the security management platform may identify the first set of tag attributes by using an ensemble machine learning technique to analyze the subset of tensors.

In some implementations, the first set of tag attributes may include a color of the tag, a type of font used for text within the tag, a font size used for the text within the tag, a set of one or more characters that are part of the text, and/or a design of the tag. In some implementations, a defect may be present that would prevent the first analysis from being able to determine the risk level, and, when determining the risk level, the security management platform may provide, as part of the second analysis, data identifying the set of tag attributes and the product price data as inputs to a data model to cause the data model to output a set of risk values that represent likelihoods of the product being scanned with the correct price, where the data model has been trained using the one or more machine learning techniques, and may determine the risk level based on the set of risk values.

In some implementations, the security management platform may select content for the alert that is to be provided to the second device based on a type of tag or based on a degree to which the risk level has satisfied or not satisfied the threshold risk level, and, when providing the second device with the alert, the security management platform may provide the second device with the alert that includes the content that has been selected, where the content includes at least one of an indication of whether the risk level satisfied the threshold risk level, a first set of instructions to investigate a transaction to purchase the product, or a second set of instructions to stop the transaction to purchase the product.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device and from a reporting device, image data that depicts a target that is subject to a security check,
        wherein the target is a tag;
    receiving, by the device, transactional data that identifies a characteristic of a transaction associated with the target,
        wherein the transactional data that identifies the characteristic of the transaction is product price data that identifies a price of a product associated with the tag;
    identifying, by the device, the target within the image data that depicts the target by using one or more object recognition techniques to analyze the image data that depicts the target;
    identifying, by the device, a set of target attributes of the target,
        wherein the set of target attributes is a first set of tag attributes;
    determining, by the device and as part of the security check, a risk level that represents a likelihood of the characteristic of the transaction having a correct value by analyzing the set of target attributes,
        wherein determining the risk level comprises:
            determining, using a matching technique that is part of one or more attribute recognition techniques,
                that the first set of tag attributes matches or satisfies a threshold level of similarity with a second set of tag attributes that are stored in association with one or more values that represent a price range that includes the price indicated by the product price data, and
            determining the risk level based on determining that the first set of tag attributes matches or satisfies the threshold level of similarity with the second set of tag attributes,
                wherein the first set of tag attributes matching or satisfying the threshold level of similarity with the second set of tag attributes serves as an indicator of the product being scanned with a correct price,
        wherein the correct value is associated with a price of the target, and
        wherein analyzing the set of target attributes includes at least one of:
            analyzing the set of target attributes using the one or more attribute recognition techniques, or
            analyzing the set of target attributes with a data model that has been trained using one or more machine learning techniques;
    determining, by the device, whether the risk level satisfies one or more threshold risk levels; and
    selecting, by the device and based on whether the risk level satisfied at least one of the one or more threshold risk levels, at least one of:
        another device that is to receive an alert, or
        content to include in the alert; and
    providing, by the device, the alert to the other device to cause the other device to perform a set of actions:
        wherein the set of actions include:
            a first subset of actions that are indicative of the risk level being associated with a low amount of risk, or
            a second subset of actions that are indicative of the risk level being associated with a high amount of risk and that are associated with assisting in prevention of a fraudulent transaction.

2. The method of claim 1,
    wherein determining the risk level comprises:
        providing data identifying the set of tag attributes and the product price data as inputs to the data model to cause the data model to output a set of risk values that represent likelihoods of the product being scanned with the correct price,
            wherein the data model had been trained using a set of features that include at least one of:
                a subset of features of particular tag attributes,
                a subset of features that relate the particular tag attributes to particular prices or price ranges, or
                a subset of features that relate the particular tag attributes to particular risk values, and
        determining the risk level based on the set of risk values.

3. The method of claim 2,
    wherein the method further comprises:
        determining to analyze the first set of tag attributes with the data model rather than using the one or more attribute recognition techniques when a defect is present that would prevent the one or more attribute recognition techniques from being able to determine the risk level.

4. The method of claim 1,
wherein the image data that depicts the target is particular image data that is part of an image;
wherein the method further comprises:
converting image data for the image to a set of tensors, wherein the image data for the image includes the particular image data;
wherein identifying the target comprises:
identifying a subset of tensors that represent the tag by using the one or more object recognition techniques to analyze the set of tensors; and
wherein identifying the set of target attributes comprises:
identifying the set of target attributes by using the data model or another data model to analyze the subset of tensors.

5. The method of claim 1,
wherein the first set of tag attributes and the second set of tag attributes include at least one of:
a color of the tag,
a type of font used for text within the tag,
a font size used for the text within the tag,
a set of one or more characters that are part of the text, or
a design of the tag.

6. The method of claim 1, wherein the tag is a tag of a product;
wherein the method further comprises:
determining a degree to which the risk level satisfies the one or more threshold risk levels;
selecting content for the alert that is to be provided to the other device based on a type of product or based on the degree to which the risk level satisfies at least one of the one or more threshold risk levels,
wherein the content includes at least one of:
an indication of whether the risk level satisfies at least one of the one or more threshold risk levels,
a first set of instructions to investigate the transaction to purchase the product, or
a second set of instructions to stop the transaction to purchase the product,
wherein providing the other device with the alert comprises:
providing the other device with the alert that includes the content to cause the other device to perform the set of actions.

7. The method of claim 1, wherein a machine learning technique, of the one or more machine learning techniques, includes one or more of:
a classification technique,
a regression technique,
a technique using a neural network, or
an anomaly detection technique.

8. A device, comprising:
one or more memories; and
one or more processors, operatively coupled to the one or more memories, to:
receive image data that depicts a tag of a product that is subject to a security check;
receive product price data that identifies a price of the product;
identify the tag within the image data that depicts the tag by using one or more object recognition techniques to analyze the image data that depicts the tag;
identify a first set of tag attributes of the tag;
determine a risk level associated with the tag based on an analysis of the first set of tag attributes,
wherein the analysis includes:
a first analysis to determine whether the first set of tag attributes matches or satisfies a threshold level of similarity with a second set of tag attributes that are stored in association with one or more values that are capable of serving as indicators of the product being priced correctly, wherein the one or more values are associated with a price associated with the tag, or
a second analysis that uses one or more machine learning techniques to analyze the first set of tag attributes to determine a likelihood that the product is priced correctly,
wherein the one or more processors, when determining the risk level, are to:
provide, as part of the second analysis, data identifying the first set of tag attributes and the product price data as inputs to a data model to cause the data model to output a set of risk values that represent likelihoods that the product is priced correctly,
wherein the data model has been trained using the one or more machine learning techniques, and
determine the risk level based on the set of risk values;
determine whether the risk level satisfies a threshold risk level;
select, based on whether the risk level satisfies the threshold risk level, at least one of:
another device that is to be a recipient of an alert, and
content that is to be used as part of the alert; and
provide the alert to the other device to cause the other device to perform a first set of actions if the risk level fails to satisfy the threshold risk level or a second set of actions if the risk level satisfies the threshold risk level.

9. The device of claim 8, wherein the device includes a sensor; and
wherein the sensor is to:
capture the image data that depicts the tag; and
provide the image data that depicts the tag to the one or more processors.

10. The device of claim 8, wherein the one or more processors, when determining the risk level, are to:
determine that the first set of tag attributes matches or satisfies the threshold level of similarity with the second set of tag attributes that are stored in association with particular values that are indicators of a price range that includes the price indicated by the product price data.

11. The device of claim 8, wherein the one or more processors are further to:
determine to analyze the first set of tag attributes with the data model rather than using the first analysis when a defect is present that would prevent the first analysis from being able to determine the risk level.

12. The device of claim 8, wherein the image data that depicts the tag is particular image data that is part of an image; and
wherein the one or more processors are further to:
convert image data for the image to a set of tensors, wherein the image data for the image includes the particular image data;
wherein the one or more processors, when identifying the tag, are to:

identify a subset of tensors that represent the tag by
using the one or more object recognition techniques
to analyze the set of tensors; and
wherein the one or more processors, when identifying the
first set of tag attributes, are to:
identify the first set of tag attributes by using a neural
network to analyze the subset of tensors.

13. The device of claim 8, wherein the one or more processors, when providing the other device with the alert, are to:
provide the other device with the alert that includes the content that has been selected,
wherein the content includes at least one of:
an indication of whether the risk level satisfies the threshold risk level,
a first set of instructions to investigate a transaction to purchase the product, or
a second set of instructions to stop the transaction to purchase the product.

14. The device of claim 8, wherein a machine learning technique, of the one or more machine learning techniques, includes one or more of:
a classification technique,
a regression technique,
a technique using a neural network, or
an anomaly detection technique.

15. A non-transitory computer-readable medium storing instructions, the instructions comprising:
one or more instructions that, when executed by one or more processors of a first device, cause the one or more processors to:
receive, from a reporting device, image data that depicts a tag of a product that is subject to a security check;
receive product price data that identifies a price of the product;
identify the tag by using one or more object recognition techniques to analyze the image data that depicts the tag;
identify a first set of tag attributes of the tag;
determine a risk level that represents a likelihood of the product being scanned with a correct price by performing an analysis of the first set of tag attributes,
wherein the analysis includes at least one of:
a first analysis to determine whether the first set of tag attributes matches or satisfies a threshold level of similarity with a second set of tag attributes that are stored in association with one or more values that are capable of serving as indicators of whether the product was scanned with the correct price,
wherein the one or more values are associated with a price associated with the tag, or
a second analysis that uses one or more machine learning techniques to analyze the first set of tag attributes to determine a likelihood of whether the product was scanned with the correct price,
wherein a defect is present that would prevent the first analysis from being able to determine the risk level, and
wherein the one or more instructions, that cause the one or more processors to determine the risk level, cause the one or more processors to:
provide, as part of the second analysis, data identifying the set of tag attributes and the product price data as inputs to a data model to cause the data model to output a set of risk values that represent likelihoods of the product being scanned with the correct price,
wherein the data model has been trained using the one or more machine learning techniques, and
determine the risk level based on the set of risk values;
determine whether the risk level satisfies a threshold risk level; and
provide an alert to a second device to cause the second device to perform a first set of actions based on the risk level not satisfying the threshold risk level or a second set of actions based on the risk level satisfying the threshold risk level.

16. The non-transitory computer-readable medium of claim 15, wherein the first device includes a sensor; and
wherein the sensor is to:
capture the image data that depicts the tag, and
provide the image data that depicts the tag to the one or more processors.

17. The non-transitory computer-readable medium of claim 15, wherein the image data that depicts the tag is particular image data that is part of an image or a video, and
wherein the one or more instructions, when executed by the one or more processors, further cause the one or more processors to:
convert image data for the image or the video to a set of tensors,
wherein the image data for the image or the video includes the particular image data;
wherein the one or more instructions, that cause the one or more processors to identify the first set of tag attributes, cause the one or more processors to:
identify a subset of tensors that represent the tag by using the one or more object recognition techniques to analyze the set of tensors; and
wherein the one or more instructions, that cause the one or more processors to identify the first set of tag attributes, are to:
identify the first set of tag attributes by using an ensemble machine learning technique to analyze the subset of tensors.

18. The non-transitory computer-readable medium of claim 15, wherein the first set of tag attributes include at least one of:
a color of the tag,
a type of font used for text within the tag,
a font size used for the text within the tag,
a set of one or more characters that are part of the text within the tag, or
a design of the tag.

19. The non-transitory computer-readable medium of claim 15, wherein the one or more instructions, when executed by the one or more processors, further cause the one or more processors to:
select content for the alert that is to be provided to the second device based on a type of tag or based on a degree to which the risk level has satisfied or not satisfied the threshold risk level; and
wherein the one or more instructions, that cause the one or more processors to provide the second device with the alert, cause the one or more processors to:
provide the second device with the alert that includes the content that has been selected,
wherein the content includes at least one of:
an indication of whether the risk level satisfied the threshold risk level, a first set of instructions to investigate a transaction to purchase the product, or a second set of instructions to stop the transaction to purchase the product.

20. The non-transitory computer-readable medium of claim 15, wherein a machine learning technique, of the one or more machine learning techniques, includes one or more of:

a classification technique, a regression technique, a technique using a neural network, or an anomaly detection technique.

* * * * *